United States Patent
Scherbinin et al.

(10) Patent No.: US 10,241,794 B2
(45) Date of Patent: Mar. 26, 2019

(54) APPARATUS AND METHODS TO SUPPORT COUNTED LOOP EXITS IN A MULTI-STRAND LOOP PROCESSOR

(71) Applicant: Intel Corporation, Santa Clara, CA (US)

(72) Inventors: Sergey P. Scherbinin, Obninsk (RU); Jayesh Iyer, Santa Clara, CA (US); Alexander Y. Ostanevich, Moscow (RU); Dmitry Maslennikov, Moscow (RU); Denis G. Motin, Moscow (RU); Alexander V. Ermolovich, Moscow (RU); Andrey Chudnovets, Moscow (RU); Sergey A. Rozhkov, San Jose, CA (US); Boris A. Babayan, Moscow (RU)

(73) Assignee: Intel Corporation, Santa Clara, CA (US)

( * ) Notice: Subject to any disclaimer, the term of this patent is extended or adjusted under 35 U.S.C. 154(b) by 45 days.

(21) Appl. No.: 15/391,703

(22) Filed: Dec. 27, 2016

(65) Prior Publication Data

US 2018/0181400 A1     Jun. 28, 2018

(51) Int. Cl.
*G06F 9/44*     (2018.01)
*G06F 9/54*     (2006.01)
(Continued)

(52) U.S. Cl.
CPC ............ *G06F 9/325* (2013.01); *G06F 8/452* (2013.01); *G06F 9/3851* (2013.01); *G06F 8/443* (2013.01);
(Continued)

(58) Field of Classification Search
CPC ...... G06F 9/325; G06F 9/381; G06F 9/30065; G06F 9/45516; G06F 8/443; G06F 8/4452; G06F 8/452; G06F 9/3851
(Continued)

(56) References Cited

U.S. PATENT DOCUMENTS 6,272,676 B1    8/2001  Haghighat et al.
8,291,197 B2    10/2012 Wu et al.
(Continued)

FOREIGN PATENT DOCUMENTS

WO        2016193774 A1    12/2016

OTHER PUBLICATIONS

Huang J., et al., "Decoupled Software Pipelining Creates Parallelization Opportunities," Proceedings of the 8th Annual IEEE/ACM International Symposium on Code Generation and Optimization, CGO '10, 2010, New York, NY, USA, pp. 121-130.
(Continued)

*Primary Examiner* — Daniel H Pan
(74) *Attorney, Agent, or Firm* — Nicholson De Vos Webster & Elliott, LLP

(57) ABSTRACT

Embodiments described herein generally relate to the field of multi-strand out-of-order loop processing, and, more specifically, to apparatus and methods to support counted loop exits in a multi-strand loop processor. In one embodiment, a processor includes a loop accelerator comprising a strand documentation buffer and a plurality of strand execution circuits; and a binary translator to receive a plurality of loop instructions, divide the plurality of loop instructions into a plurality of strands, and store a strand documentation for each of the plurality of strands into the strand documentation buffer, each strand documentation indicating at least a number of iterations; wherein the binary translator further causes the loop accelerator to execute the plurality of strands
(Continued)

asynchronously and in parallel using the plurality of strand execution circuits, wherein each of the strand execution circuits repeats the strand for the number of iterations indicated in the strand documentation associated with the strand.

20 Claims, 28 Drawing Sheets

(51) Int. Cl.
　　　*G06F 9/32*　　　(2018.01)
　　　*G06F 8/41*　　　(2018.01)
　　　*G06F 9/38*　　　(2018.01)
　　　*G06F 9/30*　　　(2018.01)
　　　*G06F 9/455*　　　(2018.01)

(52) U.S. Cl.
　　　CPC ........ *G06F 8/4452* (2013.01); *G06F 9/30065* (2013.01); *G06F 9/381* (2013.01); *G06F 9/45516* (2013.01)

(58) Field of Classification Search
　　　USPC .................. 712/203, 227, 241; 717/150–160
　　　See application file for complete search history.

(56) References Cited

U.S. PATENT DOCUMENTS

| | | |
|---|---|---|
| 9,063,735 B2 | 6/2015 | Ahn et al. |
| 2007/0169057 A1 | 7/2007 | Silvera et al. |
| 2008/0195847 A1 | 8/2008 | Wu et al. |
| 2008/0294882 A1 | 11/2008 | Jayapala et al. |
| 2009/0217020 A1* | 8/2009 | Yourst ..................... G06F 9/383 712/245 |
| 2010/0274972 A1* | 10/2010 | Babayan ............... G06F 9/3842 711/125 |
| 2014/0281407 A1* | 9/2014 | Astigeyevich ...... G06F 9/30145 712/216 |
| 2016/0179549 A1 | 6/2016 | Xekalakis et al. |
| 2016/0210145 A1 | 7/2016 | Abdallah et al. |
| 2016/0266905 A1 | 9/2016 | Winkel et al. |
| 2016/0313991 A1 | 10/2016 | Wei et al. |

OTHER PUBLICATIONS

Kaman E., et al., "Parallel-Stage Decoupled Software Pipelining," Proceedings of the 6th Annual IEEE/ACM International Symposium on Code Generation and Optimization, CGO '08, 2008, New York, NY, USA, pp. 114-123.

Extended European Search Report for Application No. 17202934.0, dated May 22, 2018, 10 pages.

Non-Final Office Action from U.S. Appl. No. 15/392,626, dated Jun. 7, 2018, 22 pages.

Partial European Search Report for Application No. 17203928.1, dated May 22, 2018, 18 pages.

Extended European Search Report for Application No. 17203928.1, dated Oct. 4, 2018, 18 pages.

* cited by examiner

| Strand Profile 400 | Relevant Instruction(s) |
|---|---|
| Instruction Pointer (IP) 402 | START_STRANDS |
| Iteration Number 404 | START_STRANDS, ADVANCE_STRAND_DOCUMENTATION |
| Loop Exit Counter 406 | CONFIGURE_STRAND, ADVANCE_STRAND_DOCUMENTATION |
| Register Bases 408 | CONFIGURE_STRAND, ADVANCE_STRAND_DOCUMENTATION |
| Program Order 410 | CONFIGURE_STRAND, ADVANCE_STRAND_DOCUMENTATION |
| Step Size 412 | CONFIGURE_STRAND, ADVANCE_STRAND_DOCUMENTATION |

EVEX Prefix 1702, Format Field 1640 (0x62), REX 1705, REX' 1710, Data Element Width Field 1664, Opcode Map 1715, VVVV Field 1720, Prefix Encoding Field 1725, Alpha Field 1652, Beta Field 1654, Class Field 1668, Write Mask Field 1670, Real Opcode Field 1730, MOD R/M 1740 (MOD 1742, REG 1744, R/M 1746), SIB 1750 (SS 1752, XXX 1754, BBB 1756), Displacement Field 1662A, Displacement Factor Field 1662B (DISP8*N when MOD=01), referred to as DISP8*N, but holds only the displacement factor which is multiplied by N, IMM8 1672.

Specific Vector Friendly Instruction Format 1700

FIG. 17B

Format Field 1640 (0x62), Full Opcode Field 1674, Prefix Encoding Field 1725, Opcode Map 1715, Data Element Width Field 1664, Real Opcode Field 1730, Base Operation Field 1642.

FIG. 17C

REX 1705, REX' 1710, Register Index Field 1644, VVVV Field 1720, REG 1744, R/M 1746, XXX 1754, BBB 1756.

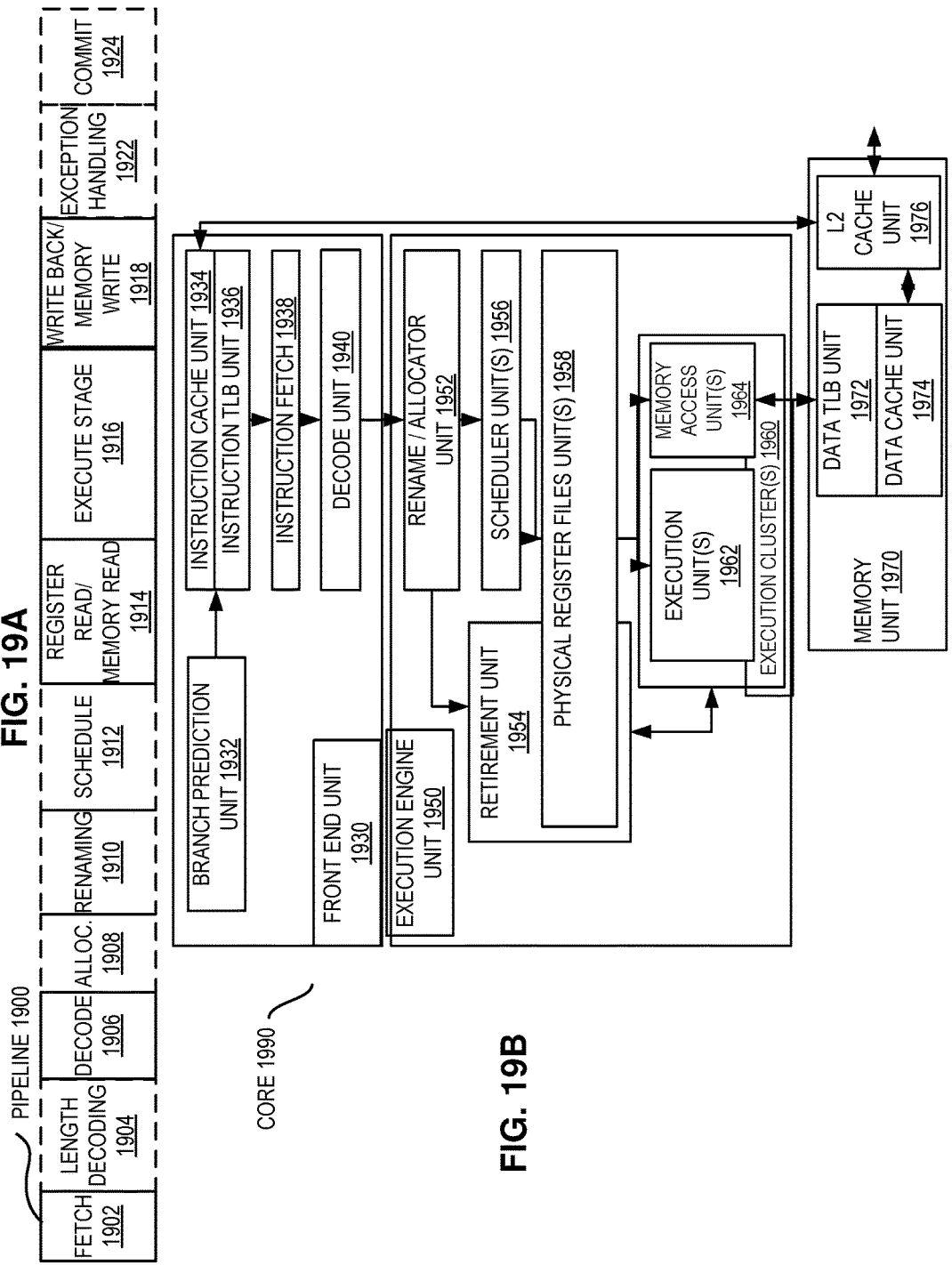

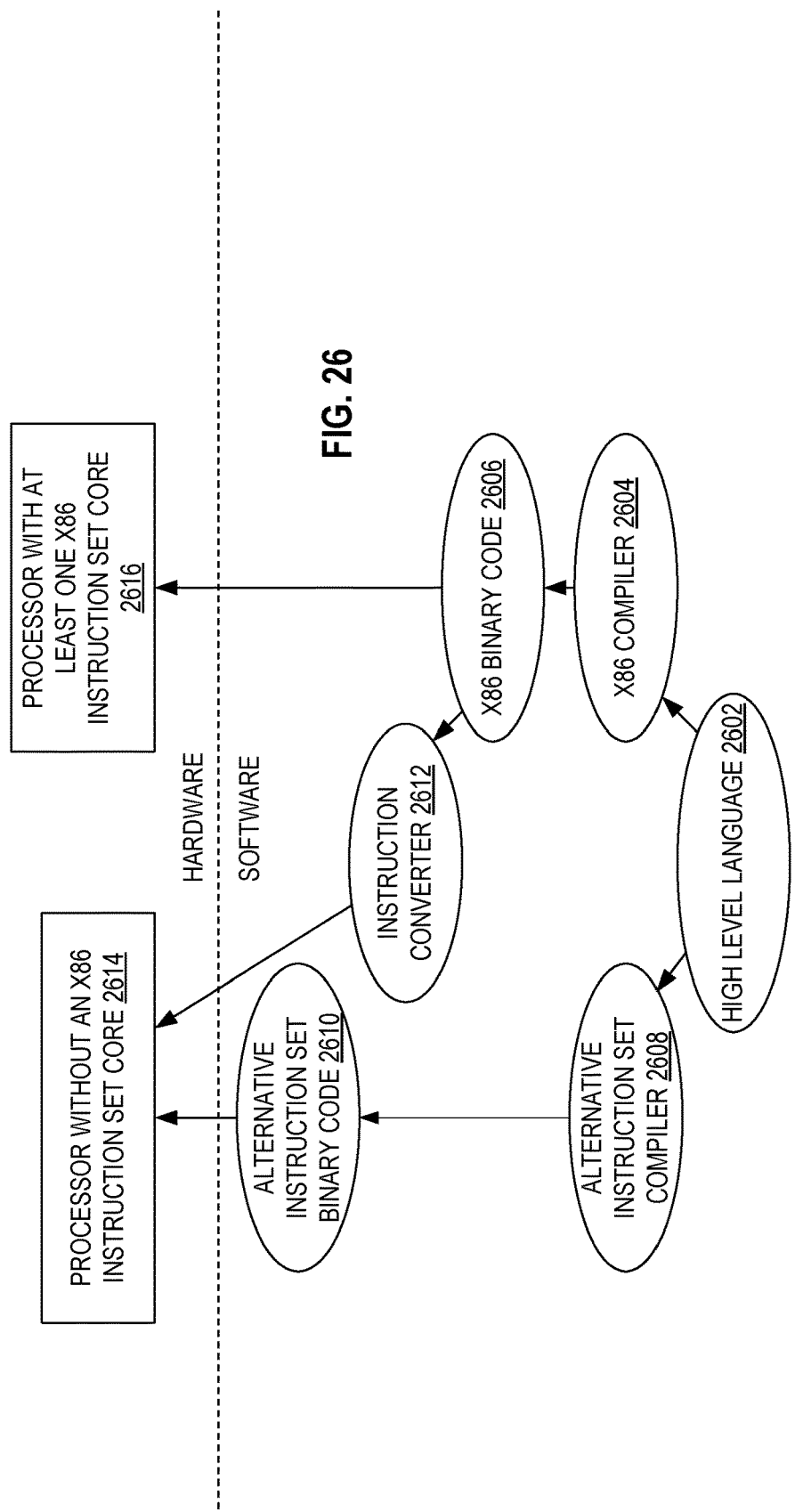

APPARATUS AND METHODS TO SUPPORT COUNTED LOOP EXITS IN A MULTI-STRAND LOOP PROCESSOR

TECHNICAL FIELD

Embodiments described herein generally relate to the field of multi-strand out-of-order loop processing, and, more specifically, to apparatus and methods to support counted loop exits in a multi-strand loop processor.

BACKGROUND INFORMATION

The presence of loops in programs is a source of significant amount of instruction-level parallelism (ILP). Different architectures try to exploit the benefits of the inter-iteration parallelism. But some approaches are limited in their scope and application, insofar as solutions utilizing multiple threads deal only with loops either with completely independent iterations or with non-ordered explicitly synchronized cross-iteration communications going thru memory.

In strand-based loop processors, a group of strands execute the same instructions of a loop in parallel, with different strands executing different iterations of the loop. A challenge that is faced is determining how to detect the iteration on which counted exit should be taken. Another challenge is to dynamically verify that hardware support can be used for loops without a statically verified counter exit.

BRIEF DESCRIPTION OF THE DRAWINGS

The various advantages of the embodiments disclosed herein will become apparent to one skilled in the art by reading the following specification and appended claims, and by referencing the drawings, in which:

FIG. 4 is a strand documentation data structure, according to some embodiments;

FIG. 16A is a block diagram illustrating a generic vector friendly instruction format and class A instruction templates thereof according to embodiments of the invention;

FIG. 16B is a block diagram illustrating the generic vector friendly instruction format and class B instruction templates thereof according to embodiments of the invention;

FIG. 17A is a block diagram illustrating an exemplary specific vector friendly instruction format according to embodiments of the invention;

FIG. 17B is a block diagram illustrating the fields of the specific vector friendly instruction format that make up the full opcode field according to one embodiment of the invention;

FIG. 17C is a block diagram illustrating the fields of the specific vector friendly instruction format that make up the register index field according to one embodiment of the invention;

FIG. 19A is a block diagram illustrating both an exemplary in-order pipeline and an exemplary register renaming, out-of-order issue/execution pipeline according to embodiments of the invention;

FIG. 19B is a block diagram illustrating both an exemplary embodiment of an in-order architecture core and an exemplary register renaming, out-of-order issue/execution architecture core to be included in a processor according to embodiments of the invention;

FIG. 20A is a block diagram of a single processor core, along with its connection to the on-die interconnect network 2002 and with its local subset of the Level 2 (L2) cache 2004, according to embodiments of the invention;

FIG. 20B is an expanded view of part of the processor core in FIG. 20A according to embodiments of the invention;

FIG. 22 shows a block diagram of a system in accordance with one embodiment of the present invention;

FIG. 23 is a block diagram of a first more specific exemplary system in accordance with an embodiment of the present invention;

FIG. 24 is a block diagram of a second more specific exemplary system in accordance with an embodiment of the present invention;

FIG. 25 is a block diagram of a System-on-a-Chip (SoC) in accordance with an embodiment of the present invention; and FIG. 26 is a block diagram contrasting the use of a software instruction converter to convert binary instructions in a source instruction set to binary instructions in a target instruction set according to embodiments of the invention.

DETAILED DESCRIPTION OF THE EMBODIMENTS

Figure 1:
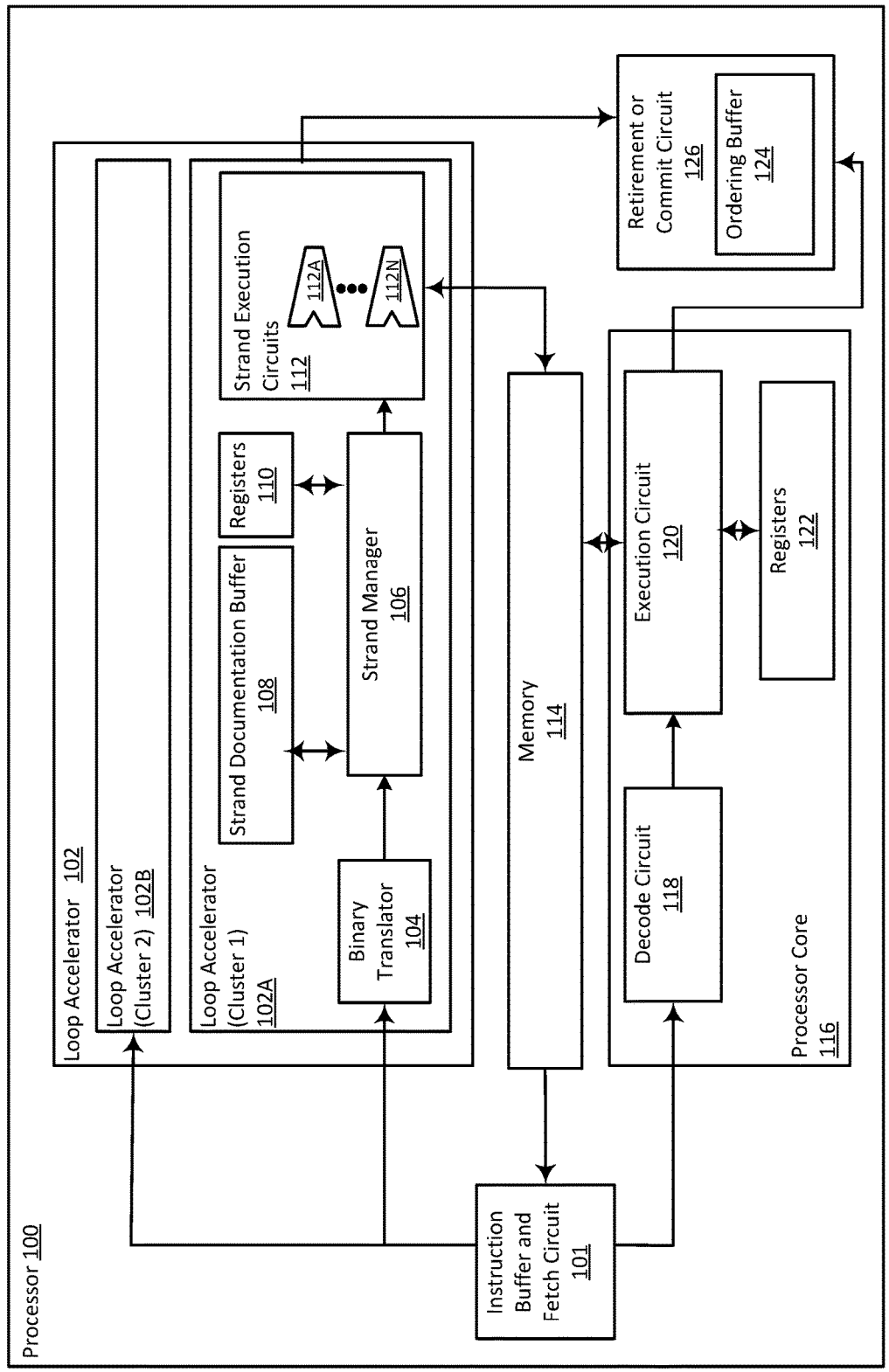
FIG. 1 is a block diagram of a processor using a loop accelerator to support counted loop exits in a multi-strand loop processor, according to some embodiments.

In the following description, numerous specific details are set forth. However, it is understood that embodiments of the disclosure are practiced without these specific details. In other instances, well-known circuits, structures and techniques have not been shown in detail to not obscure the understanding of this description.

References in the specification to "one embodiment," "an embodiment," "an example embodiment," etc., indicate that the embodiment described includes a feature, structure, or characteristic, but every embodiment does not necessarily include the feature, structure, or characteristic. Moreover, such phrases are not necessarily referring to the same embodiment. Further, when a feature, structure, or characteristic is described about an embodiment, it is submitted that it is within the knowledge of one skilled in the art to affect such feature, structure, or characteristic about other embodiments whether explicitly described.

Various operations may be described as multiple discrete actions or operations in turn, in a manner that is most helpful in understanding the claimed subject matter. However, the order of description should not be construed as to imply that these operations are necessarily order dependent. In particular, at least some operations may be performed other than in the order presented. Operations described may be performed in a different order than the described embodiment. Various additional operations may be performed and/or described operations may be omitted in additional embodiments.

Some processors that support loop processing do so in the context of a single execution strand only, rather than a plurality of strands asynchronously executing the same code or code sequence in parallel, nor do they suggest any dynamic verification schema to check if that hardware support can be used for loops without statically verified counted exit.

In some strand-based loop processors, a group of strands execute the same code or code sequence of a loop (or loop pipeline stage) in parallel: different strands execute different iterations. As used herein, a counted loop exit is a loop exit for which the number of the iteration on which it will be taken is known in advance (before start of loop execution). If loop has counted exit then it is possible to utilize hardware support, such as a hardware counter, for automatic detection of the iteration on which counted exit should be taken. Embodiments disclosed herein describe such hardware support. Disclosed embodiments further describe a schema of dynamic verification, which can be used to ensure that the hardware support can be correctly utilized.

As used herein, a strand or micro-thread is a sequence of instructions arranged by a binary translator (e.g., at program compilation time for the hot loops identified), where instructions belonging to the same strand or micro-thread are to be executed by the hardware in-order.

As used herein, a multi-strand out-of-order loop accelerator (sometimes referred to herein simply as a multi-strand loop processor or a loop accelerator) is an accelerator that processes multiple strands or micro-threads created by a binary translator in parallel such that: (1) instructions of a strand or micro-thread may be fetched, issued, and executed out of program order with respect to instructions of different strands or micro-threads and (2) all but memory and interruptible instructions may be committed (retired) out of program order.

As used herein, a loop having hardware support means that some additional hardware facilities are provided to the loop, such as special fields in a strand documentation and corresponding logic to handle them.

As used herein, a counted loop exit is a loop exit for which number of iteration on which it will be taken is known in advance (before start of loop execution).

As used herein, a verified counted loop exit is a counted loop exit for which it is proven that number of iteration on which it will be taken can be used in hardware support of counted exit detection.

Some embodiments disclosed herein include at least three features used to support counted loop exits in a multi-strand loop processor: First, a LOOP_EXIT_COUNTER field in a strand documentation is provided to hold a number of iterations in a loop. In some embodiments, the strand documentation is stored in a hardware strand documentation buffer. Second, a set of instructions, including at least START_STRANDS, CONFIGURE_STRAND, ADVANCE_STRAND_DOCUMENTATION, and COUNTED_EXIT_BRANCH is provided and used by the binary translator and the loop accelerator to manage execution of the strands and support dynamic counted exit detection. ADVANCE_STRAND_DOCUMENTATION, for example, is used to decrement LOOP_EXIT_COUNTER and to check whether exit is to be taken. Third, a dynamic verification schema is provided to determine whether hardware support of counted exit detection can be used for each dynamic instance of a loop.

Embodiments disclosed herein describe techniques for identifying and translating loop code contained in a program code stream (e.g., x86 code) by a binary translator to allow efficient utilization of both iteration-level and instruction-level parallelisms naturally existing in loops. In some embodiments, the binary translator prepares the loop code (which has enough iteration-level parallelism) and offloads it to be executed on the multi-strand loop accelerator, while a main processor executes the rest of the code. With the aid of the binary translator, the loop accelerator can implement strand-based software pipelining.

A first aspect of some embodiments disclosed herein is the creation of jobs/strands by the binary translator, based on the characteristic of loop code as well as potential for extracting parallelism. Binary translator techniques for exploiting parallelism on multiple levels of granularity and utilizing unique features of a strand-based architecture are utilized.

A second aspect of some embodiments disclosed herein is construction of a data-flow pipeline for loop execution by means of strands and organization of cross-strand communication through a common register file.

A third aspect of some embodiments disclosed herein is creation of strand documentation for each strand. As used herein, a strand documentation is sometimes referred to as "strand profile", or just "documentation." A strand documentation or strand profile is a hardware buffer per strand and carries information to distinguish a strand and its dynamic instance through multiple execution iterations.

A fourth aspect of some embodiments disclosed herein is a plurality of instructions placed in code translated by a binary translator. In some embodiments, the plurality of instructions is used to control how the loop accelerator is to process strands. In some embodiments, the plurality of instructions is used to control how the strand documentation is to be updated over its lifetime.

According to some embodiments, arbitrarily loopy program code is divided into strands for parallel execution on a plurality of execution units of the loop accelerator. More specifically, the binary translator in some embodiments identifies loops in the program code and divides the loop code into jobs by applying at least one job creation rule, as further described below. Furthermore, in some embodiments, the binary translator groups the jobs into one or more stages by applying at least one stage creation rule, as further described below. Furthermore, in some embodiments, each of the jobs is assigned to at least one strand by applying at least one strand creation rule, as further described below. In such embodiments, the loop accelerator manages execution of the strands using a plurality of execution circuits in a strand-based architecture. As further detailed below, the at least one job creation rule, the at least one stage creation rule, and the at least one strand creation rule together aim to achieve at least one of identifying and accelerating a critical recurrent dependence chain (if any), maximizing utilization of the plurality of execution circuits, minimizing idle time of any of the plurality of execution circuits, reducing a number of dependences among strands, balancing execution rates of the plurality of strands, and otherwise improving loop performance and power utilization.

As used herein, a "critical chain" is a sequence of mutually data-dependent operations or instructions within a loop body that limits the upper bound of loop speed and execution rate. Such a sequence may contain one or several instructions that are repeated on each loop iteration, and, given particular instruction latencies, is a "critical path" of loop execution. As also used herein, a loop "execution bandwidth" is a number of particular instructions that the hardware is capable of issuing per each clock cycle. The higher the performance capabilities of the hardware, the higher the execution bandwidth. In some embodiments, the binary translator is to analyze a loop body and determine how to improve performance by addressing the critical chain and by maximizing the execution bandwidth. A first advantage of some embodiments disclosed herein is that they make use of at least some specific features of processor architectures based on multiple asynchronously working tightly-coupled micro threads in the presence of speculative calculations, and particularly speculative execution of loop iterations. This means that execution of every loop iteration can start before finish of previous iteration execution. Every iteration is executed asynchronously with loop exit conditions calculating at previous iterations.

Redundant speculative iterations for those architectures are iterations which are already executed and logically located after exit iteration (the iteration where execution exits the loop). When a hardware counter is enabled, the exit iteration is known before loop execution. This makes it possible to avoid execution of redundant speculative iterations of the loop for such architectures. Thus, the execution becomes free from redundant instructions. The more micro threads number and the more parallelization window are supported by hardware, the more meaningful for power efficiency such effect of a hardware counter utilization becomes.

A second advantage of some embodiments disclosed herein is that when a hardware counter is utilized, a number of operations in the loop can be decreased. This can be done due to substitution of conditional loop exit instructions and instructions that calculate this condition by low-cost instructions based on hardware counter logic.

Yet another advantage of embodiments disclosed herein is that they support a power efficient design which is capable of at least some reduction of energy per instruction.

Other advantages will be apparent to one having ordinary skill in the art from the disclosure provided herein.

Loop Accelerator

Embodiments disclosed herein provide a loop accelerator processor, which is able to execute asynchronously, with the help of a binary translator which places instructions into different strands or micro-threads that can be executed in parallel. The multiple micro-threads (strands) communicate with each other through a common register file. The loop accelerator executes instructions of the same strand sequentially (in-order) while instructions of different strands can be executed out-of-order if there are no dependencies between them (e.g., data flow dependencies) preventing such potential re-ordering. Note, that presence of dependent instructions in two strands imposes only ordering of said instructions, not the entire strands which can still run in parallel. At any clock, the loop accelerator processor checks the current instructions of all strands to determine whether any of them is ready for execution, and, if so, dispatches to execution ports instructions which don't have blocking dependencies.

FIG. 1 is a block diagram of a system in which improving processor power-performance using a binary translator is implemented, according to some embodiments. As shown, processor 100 includes processor core 116 and loop accelerator 102 implemented as one or more clusters 102A 102B, instruction buffer and fetch circuit 101, binary translator 104, execution circuits 112 and 120, registers 110 and 122, memory 114, ordering buffer 124, and retire or commit circuit 126.

In some embodiments, processor core 116 is a conventional processor. In some embodiments, processor core 116 is a conventional processor that supports an x86 instruction set architecture. In some embodiments, processor core 116 is any one of the processors and processor cores described below, at least with respect to FIG. 19A, FIG. 19B, FIG. 21, and FIG. 26, as described below.

In operation, an instruction is input from instruction buffer and fetch circuit 101, which comprises a cache memory, an on-chip memory, a memory on the same die as the processor, an instruction register, a general register, or system memory, without limitation. Instruction buffer and fetch circuit 101, which comprises a cache memory, an on-chip memory, a memory on the same die as the processor, an instruction register, a general register, or system memory, therefore represent examples of means for receiving a plurality of instructions from an instruction storage. Decode circuit 118 decodes the instruction. In one embodiment, the instruction comprises fields discussed further below, at least with respect to FIGS. 16A-B, and 17A-D, as further described below. The decoded instruction is executed by execution circuit 120. Execution circuit 120 is configured to read data from and write data to registers 122 and memory 114. Registers 122 comprise any one or more of a data register, an instruction register, a general register, and an on-chip memory. An embodiment of a register file is discussed below, at least with respect to FIG. 18. Memory 114 comprises any one or more of an on-chip memory, a memory on the same die as the processor, a memory in the same package as the processor, a cache memory, and system memory. Several exemplary embodiments of execution circuit 120 are described further below, at least with respect to FIG. 19A, FIG. 19B, FIG. 21, and FIG. 26, as further described below. Retire or commit circuit 126 ensures that execution results are written to or have been written to their destinations, and frees up or releases resources for later use.

Figure 2:
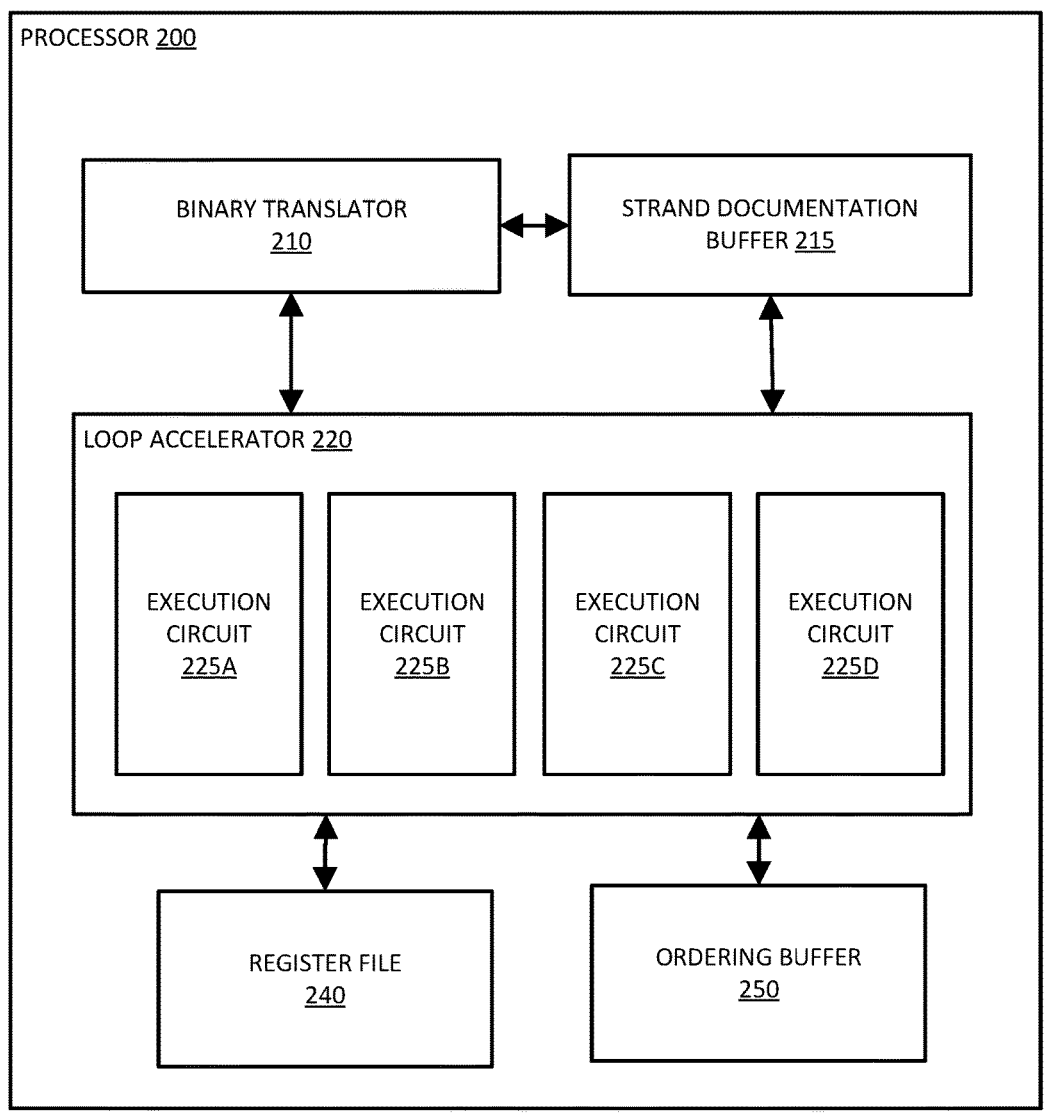
FIG. 2 is a block diagram of a processor using a loop accelerator and containing a binary translator to support counted loop exits in a multi-strand loop processor, according to some embodiments.

FIG. 2 is a block diagram of a processor using a loop accelerator and containing a binary translator to support counted loop exits in a multi-strand loop processor, according to some embodiments. As shown in the diagram, the processor 200 includes a binary translator 210, a strand documentation buffer 215, a loop accelerator 220, a register file 240, and an ordering buffer 250. Binary translator 210 translates program code (e.g., x86 binary) into code that can be run on the loop accelerator 220. Binary translator 210 may perform static analysis of the program code to identify any loops in the program code. Based on this static analysis, binary translator 210 may decompose the loops in the program code into one or more strands. A strand (which may also be referred to as a micro-thread) is a sequence of instructions arranged by binary translator 210, where instructions belonging to the same strand are to be executed by hardware in-order. As will be described in additional detail below, multiple strands can be executed in parallel by the loop accelerator 220 to accelerate loop execution, where instructions from different strands may be executed out-of-order. Binary translator 210 may create strands based on the characteristics of the loops in the program code. For example, binary translator 210 may create strands such that dependent instructions (e.g., dependent on register or memory) are placed in the same strand as other instructions they depend upon, while independent instructions are placed in separate strand. This allows the strand with the independent instructions to make progress even if the strand with the dependent instructions is stalled (e.g., because it is waiting for a memory access operation to complete).

In one embodiment, binary translator 210 is communicatively coupled to a strand documentation buffer 215 that stores strand documentation. In one embodiment, the strand documentation buffer 215 stores strand documentation for each strand (per strand) that is being executed by the loop accelerator 220. The strand documentation for a strand includes information regarding the properties of the strand. Although the strand documentation buffer 215 is described above as being a single buffer that includes strand documentation for all strands, it should be understood that other embodiments may provide a separate strand documentation buffer 215 (hardware buffer) per strand that is to store strand documentation for the corresponding strand. In one embodiment, the strand documentation for a strand includes an indication of an instruction pointer for the strand. The instruction pointer for a strand indicates the current instruction being executed by the strand (or the next instruction to be executed by the strand, depending on implementation).

The strand-based architecture thus employs multiple instruction pointers (one per strand), which is in contrast to a typical superscalar processor that only employs a single instruction pointer. In one embodiment, the strand documentation for a strand includes an indication of an iteration number for the strand. The iteration number for the strand indicates the current loop iteration that is being executed by the strand. In one embodiment, the strand documentation for a strand includes an indication of a loop exit counter for the strand. The loop exit counter for the strand allows detection of a counted exit. In one embodiment, the strand documentation for a strand includes an indication of a register base for the strand. The register base for the strand indicates the set of registers that the strand can work with for the current loop iteration being executed by the strand. The strand documentation 220 for a strand may thus contain information that defines the current state of execution of the strand (e.g., which instruction is being executed, which iteration within the loop is being executed, and which registers the strand can work with). As such, different strands can execute the same program code (e.g., code within a loop body) in parallel, but for different loop iterations, depending on the values set in the strand documentation.

Binary translator 210 is communicatively coupled to the loop accelerator 220 and may provide strands to the loop accelerator 220 for execution. The loop accelerator 220 is a hardware component that is dedicated for accelerating loop execution. The loop accelerator 220 includes multiple execution circuits 225A-D to process multiple strands in parallel. As shown in the diagram, the loop accelerator 220 includes four execution circuits 225A-D. As such, this loop accelerator 220 is able to process four strands in parallel. It should be understood that the loop accelerator 220 can include more or less execution circuits 225A-D than shown in the diagram. The loop accelerator 220 executes instructions belonging to the same strand sequentially (in-order). However, the loop accelerator 220 may execute instructions belonging to different strands non-sequentially (out-of-order) as long as there are no dependencies between them that prevent such parallelization. The loop accelerator 220 is communicatively coupled to a register file 240 that includes multiple registers. The loop accelerator 220 (and more specifically, the execution circuits 225A-D of the loop accelerator 220) may work with the registers of the register file 240 when executing instructions. The loop accelerator 220 is also communicatively coupled to an ordering buffer 250, which stores entries for load instructions to preserve their until they are ready to be retired.

Figure 3:
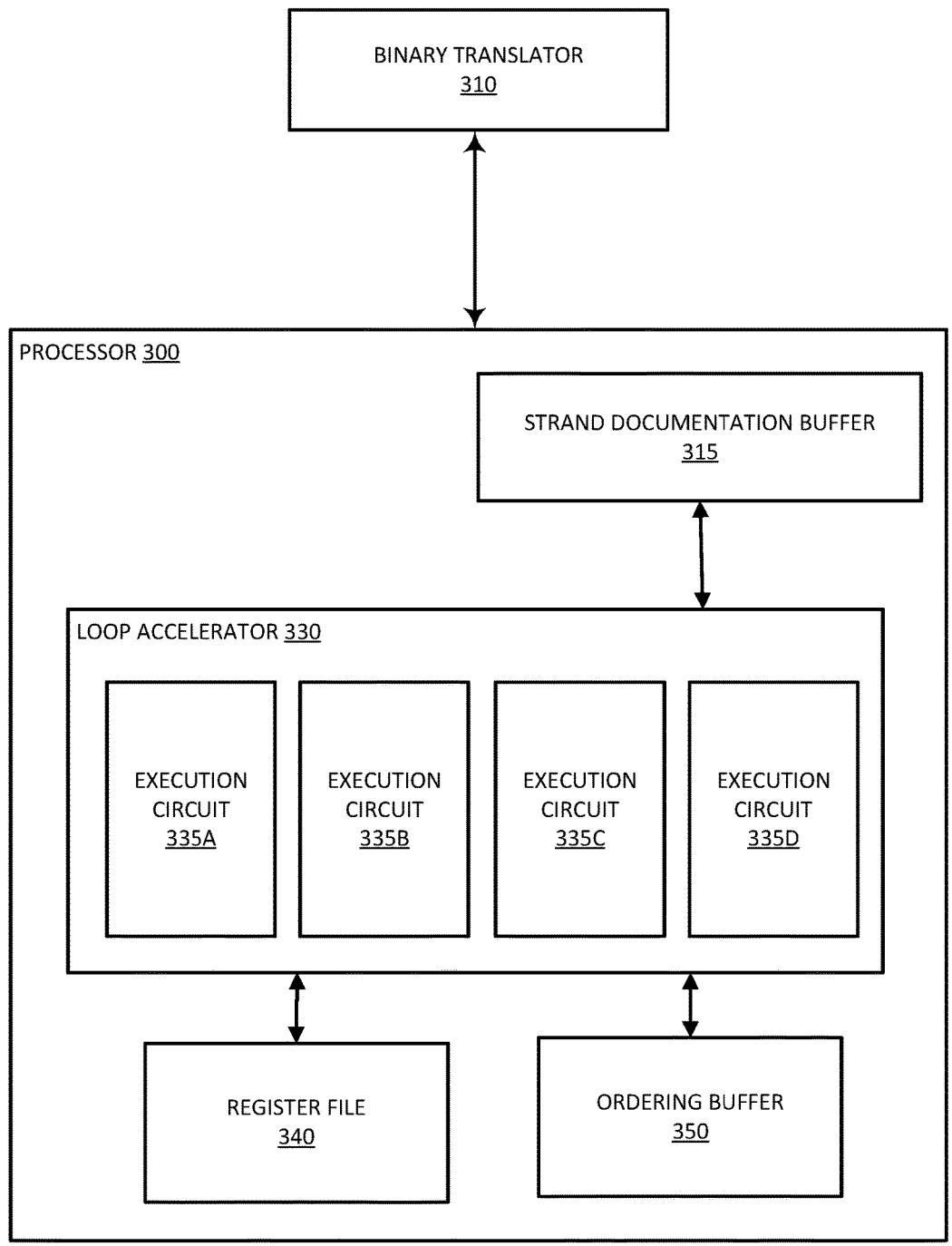
FIG. 3 is a block diagram of a computing system including a processor using a loop accelerator, with a binary translator implemented external to the processor to support counted loop exits in a multi-strand loop processor, according to some embodiments.

FIG. 3 is a block diagram of a computing system including a processor using a loop accelerator, with a binary translator implemented external to the processor to support counted loop exits in a multi-strand loop processor, according to some embodiments. The system has similar components as the processor 100 shown in FIG. 1: processor 300 includes strand documentation buffer 315, loop accelerator 330, which includes execution circuits 335A-D, register file 340, and ordering buffer 350. Except, binary translator 310 is implemented external to the processor 300 (e.g., as a software implementation). It should be understood that the arrangement of components shown in the diagrams is provided by way of example and not limitation. Different embodiments may employ a different arrangement of components than shown in the diagrams.

In some embodiments, binary translator 310 constructs a data-flow pipeline for execution by the loop accelerator by means of strands and organization of cross-strand communication through a common register file.

Strand Documentation

FIG. 4 is a strand documentation data structure, according to some embodiments. In some embodiments, each strand has its own strand documentation, which, as used herein, comprises data that allows differentiation of strands from each other. At every moment of time, the strand documentation reflects the logical point of loop execution that the strand is currently executing. In particular, the strand documentation 400 includes:

Instruction pointer (IP) 402.

Iteration number 404.

Loop exit counter (allows detection of counted exit) 406, which, for each loop iteration, holds an amount of iterations (starting from a current one) which should be executed before counted loop exit should be taken. So, if total amount of iterations is N, then for first iteration LOOP_EXIT_COUNTER=N, while for the very last iteration LOOP_EXIT_COUNTER=1.

Register bases 408 (used to access common registers).

Program order 410 (reflecting initial program order to organize sequential retirement).

Step size 412, an optional field, as indicated by dashed lines. This field, if not present, has a default value equal to 1.

Different strands can execute the same code, but since they have different strand documentations, they can work on different loop iterations.

Translation Rules Applied by Binary Translator

According to some embodiments disclosed herein, a binary translator translates program code into translated program code and seeks to exploit parallelism on multiple levels of granularity. Disclosed embodiments seek to maximize execution speed and minimize power utilization for a given set of hardware resources executing arbitrarily loopy code.

Jobs, Stages, and Strands

Jobs: A binary translator in some embodiments splits each loop iteration into several parts (jobs), each job consisting of one or more instructions or operations. Each instruction of the loop program code is to be included in at least one job. An instruction may also be replicated to be included in several jobs. If splitting produces only one job, then that job is to perform all instructions from the loop iteration.

Figure 5A:
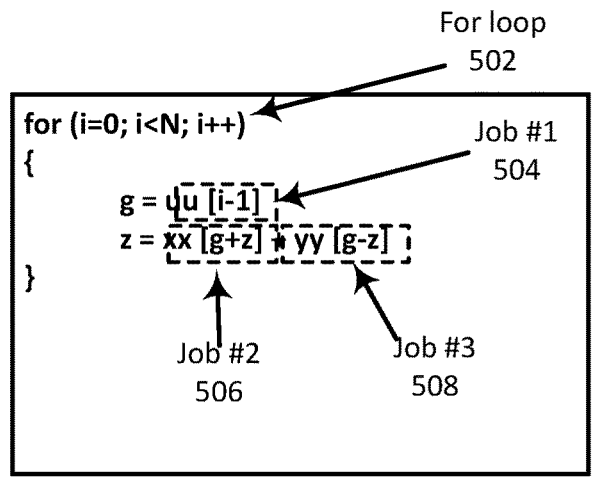
FIG. 5A is pseudocode illustrating a loop being decomposed into multiple jobs, according to some embodiments.

FIG. 5A is pseudocode of a loop being decomposed into multiple jobs, according to some embodiments. As shown in FIG. 5A, the instructions that make up the body of the for loop 502 have been divided into three groups: job #1 504, job #2 506, and job #3 508. For example, iteration of loop at FIG. 5A is split into three jobs.

Figure 5B:
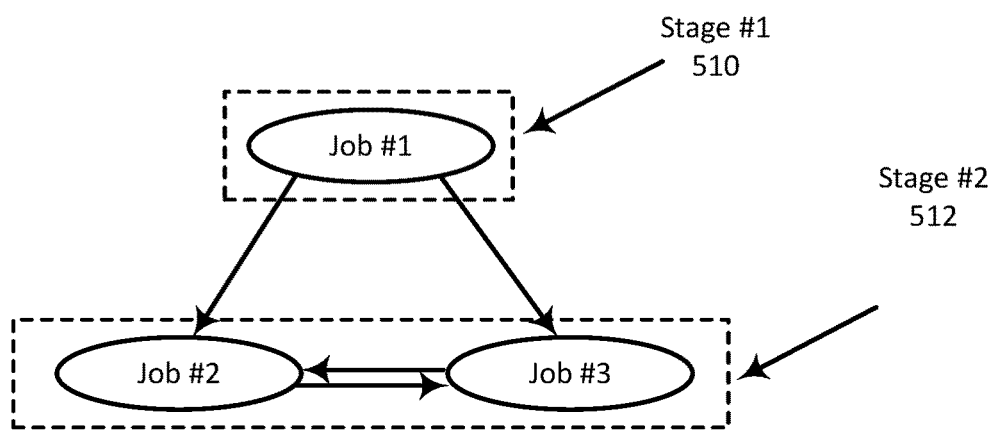
FIG. 5B is a block diagram illustrating a loop being decomposed into multiple jobs, according to some embodiments.

Stages: Each job is included into a stage. Several jobs can be included into the same stage. Different stages contain different jobs. As used herein, a stage is sometimes referred to as a pipeline stage. FIG. 5B is a block diagram of a loop being decomposed into multiple jobs and multiple stages, according to some embodiments. As shown in FIG. 5B, a first stage 510 contains one job while a second stage 512 contains two jobs.

In some embodiments, both cross-stage and cross-job data communications are implemented as data transfers that go through a common register file. In some embodiments, a data flow pipeline is created by dividing a loop iteration into stages, or pipeline stages. In some embodiments, data hazards and data dependencies are dealt with by forwarding operands between pipeline stages using a register file as an intermediary.

Strands: Each job is executed by a separate set of one or more strands (different jobs are executed by different strands). Execution of a job means execution of instructions assigned to that job from all iterations of a loop. As used herein, if only one strand is given for execution of a job, then that strand executes all iterations of that job consequently starting from first one. As used herein, if more than one strand is given for execution of a job, then those strands execute iteration of a job in an interleaving manner: e.g., if two strands are given then the first strand executes all odd iterations while the second one executes all even iterations. If one or more jobs are executed by one or more strands, then data transfers between those strands correspond to loop-carried data flows, and are implemented using a common register file.

Exemplary Job Creation Rules

In various embodiments, one or more rules are applied for dividing loop code into jobs. The various embodiments of job creation rules described below attempt to achieve at least one of identifying and accelerating a dominant critical recurrent dependence chain (if any), maximizing utilization of the plurality of execution circuits, minimizing idle time of any of the plurality of execution circuits, reducing a number of dependences among strands, balancing execution rates of the plurality of strands, and otherwise improving loop performance and power utilization.

Exemplary Job Creation Rule #1

In some embodiments, one job creation rule calls for each loop recurrence that can affect a rate of loop execution (critical recurrence) to be split into separate jobs. In some embodiments, those jobs do not contain instructions not belonging to that critical recurrence. More than one job can be needed in order to parallelize execution of a recurrence on instruction level thereby achieving best possible execution speed.

Figure 6:
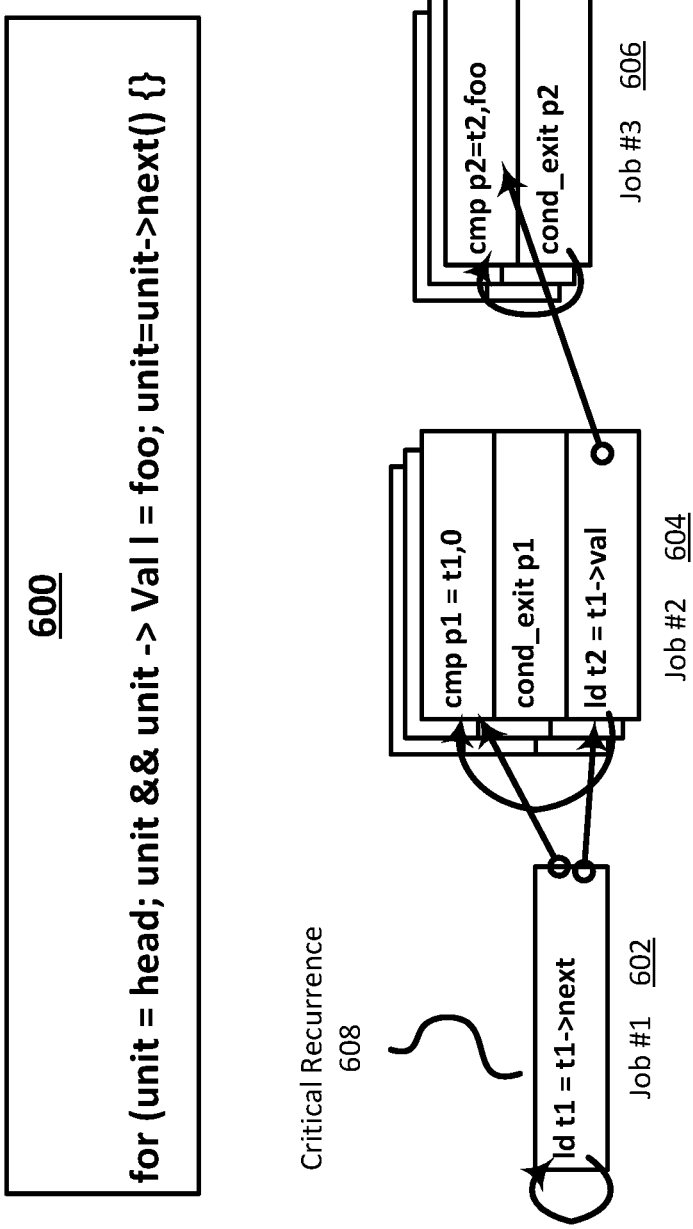
FIG. 6 is pseudocode and a block diagram illustrating a loop being decomposed into multiple jobs, according to some embodiments.

FIG. 6 is pseudocode and a block diagram of a loop being decomposed into multiple jobs, according to some embodiments. As shown, the loop 600 is divided into job #1 602 with one instruction, job #2 604 with three instructions, and job #3 606 with two instructions. Job #1 602 in this embodiment is designated as a critical recurrence. In some embodiments, a binary translator can determine that an instruction is a critical instruction by analyzing one or more of its opcode, its operands, and its historical performance. As an example of Job Creation Rule #1, the only critical recurrence 608 is put into one job since one job is enough to ensure maximum execution speed for it.

Exemplary Job Creation Rule #2

In some embodiments, a second job creation rule calls for each loop recurrence that can be run in parallel with other loop recurrences to be divided into its own job. That way, when multiple jobs from that rule stage are assigned to strands and executed by the loop execution circuits, they can be executed in parallel. In FIG. 5B, for example, two jobs are formed for execution of the recurrence of stage #2 512 since its instructions can run in parallel.

Exemplary Job Creation Rule #3

In some embodiments, a third job creation rule calls for placing non-critical recurrence into a same job as other non-critical recurrences of a loop iteration.

Exemplary Job Creation Rule #4

In some embodiments, a fourth job creation rule calls for forming an artificial critical recurrence consisting of the union of several non-critical recurrences and/or instructions contained in non-critical recurrent sequences of instructions.

Exemplary Job Creation Rule #5

In some embodiments, a fifth job creation rule calls for forming a job to contain a nested loop or inner loop. In some embodiments, such a job can be treated as a critical recurrence. In some embodiments, such a job can be joined into a stage containing other jobs that can be run in parallel.

Figure 7:
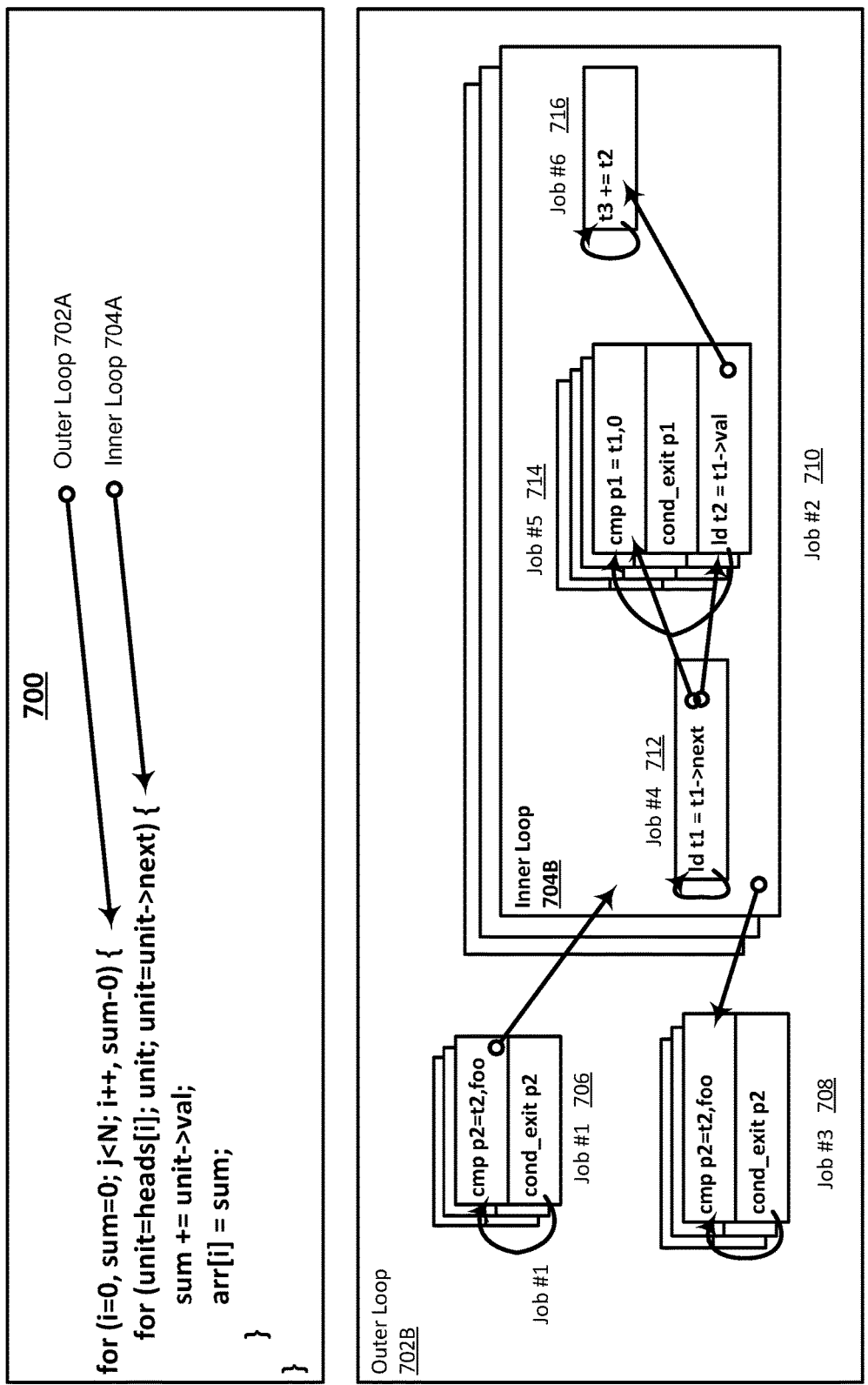
FIG. 7 is pseudocode and a block diagram illustrating a loop being decomposed into multiple jobs, according to some embodiments.

FIG. 7 is pseudocode and a block diagram of a loop decomposed into multiple jobs, according to some embodiments. As shown, loop 700 includes an outer loop 702A, B and an inner loop 704A, B. Outer loop 702B includes job #1 706 and job #3 708. As an example of Job Creation Rule #5, job #2 710 has been formed to contain inner loop 704B, which includes job #4 712, job #5 714, and job #6 716.

Exemplary Job Creation Rule #6

In some embodiments, a sixth job creation rule calls for isolating jobs that are likely to be delayed, for example by dynamic races for execution resources, to be isolated into separate jobs to avoid causing an artificial delay of other instructions in the job. Instructions which can be executed only on a few number of execution channels or have small execution throughput have a good chance to be delayed and are to be isolated into separate jobs according to Job Creation Rule #6. Otherwise, dynamic delay of such instructions leads to artificial delay of all other instructions following it in a job. In order to prevent such undesirable situations, instructions that have a good chance of incurring a delay are to be isolated in separate jobs which don't contain other important operations to be artificially delayed.

Exemplary Job Creation Rule #7

In some embodiments, a seventh job creation rule calls for distributing the rest of the instructions among jobs in a way to minimize a number of cyclic dependencies between stages.

Exemplary Job Creation Rule #8

In some embodiments, an eighth job creation rule calls for replicating an instruction into several jobs so as to decrease the amount of cross-job data dependencies.

Exemplary Job Creation Rule #9

In some embodiments, a ninth job creation rule calls for splitting big jobs into smaller ones. For example, this can take place if only few iterations of a job fit parallelization window, which can be defined by size of a memory ordering buffer (MOB) for example, and iteration-level parallelism cannot be applied aggressively for the job. In some sense, such job forms a new artificial recurrence since its next iterations can't be executed until previous ones free MOB entries. If such recurrence becomes a critical one, then in order to speed up such a big job, it can be split into two or more lesser ones. This split resembles one performed for critical recurrences since both of them are done in order to exploit instruction-level parallelism in conditions of lack of iteration-level parallelism.

Exemplary Job Creation Rule #10

The exemplary Job Creation Rules described above are to be used in some of the embodiments described herein. But additional Job Creation Rules can be implemented and applied in other embodiments. In some embodiments, a tenth job creation rule calls for seeking opportunities to group instructions into jobs so as to achieve at least one of identifying and accelerating a dominant critical recurrent dependence chain (if any), maximizing utilization of the plurality of execution circuits, minimizing idle time of any of the plurality of execution circuits, reducing a number of dependences among strands, balancing execution rates of the plurality of strands, and otherwise improving loop performance and power utilization.

Exemplary Stage Creation Rules

In various embodiments, one or more rules are applied for assigning jobs to stages. The various embodiments of stage creation rules described below attempt to achieve at least one of identifying and accelerating a dominant critical recurrent dependence chain (if any), maximizing utilization of the plurality of execution circuits, minimizing idle time of any of the plurality of execution circuits, reducing a number of dependences among strands, balancing execution rates of the plurality of strands, and otherwise improving loop performance and power utilization.

Exemplary Stage Creation Rule #1

Figure 8:
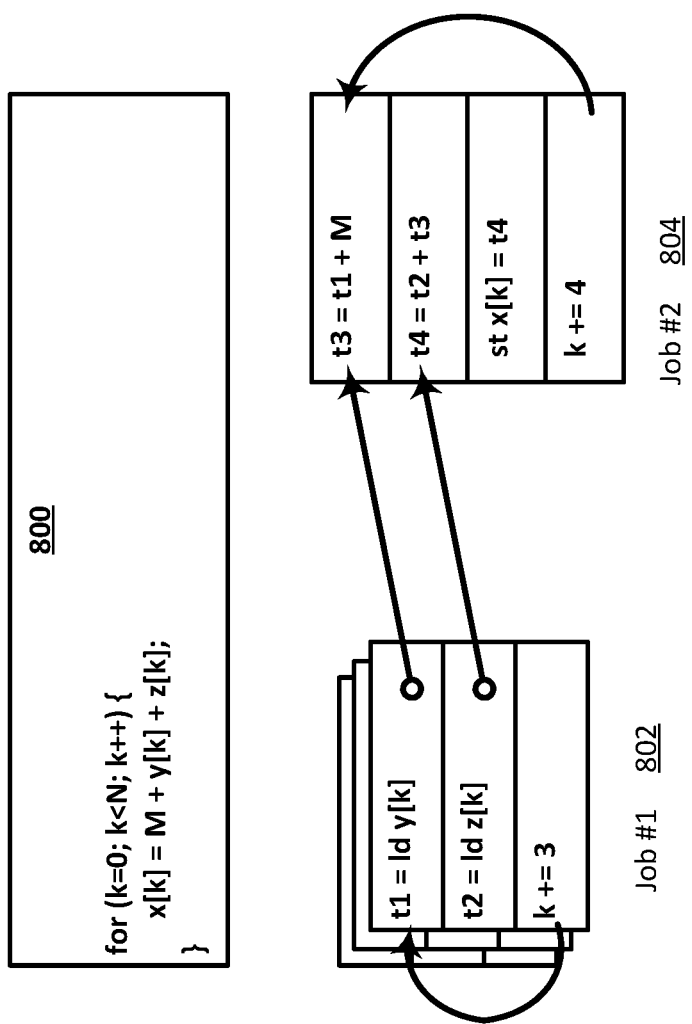
FIG. 8 is pseudocode and a block diagram illustrating a loop being decomposed into multiple jobs, according to some embodiments.

In some embodiments, a first stage creation rule calls for instruction with long latency (e.g., 'ld' instruction which can miss cache) and its consumers are put in different stages. This rule enables minimization of dynamically idle strands when dealing with long latency instructions. For example, FIG. 8 is pseudocode and a block diagram illustrating a loop being decomposed into multiple jobs, according to some embodiments. As shown, for loop 800 is divided into job #1 802 and job #2 804. This rule is applied to the memory load 'ld' instruction of job #1 802.

Exemplary Stage Creation Rule #2

In some embodiments, a second stage creation rule calls for placing producers and consumers of non-recurrent loop-carried data flow in different stages if a producer includes instructions that are to be executed before the consumer in a control flow.

Figure 9:
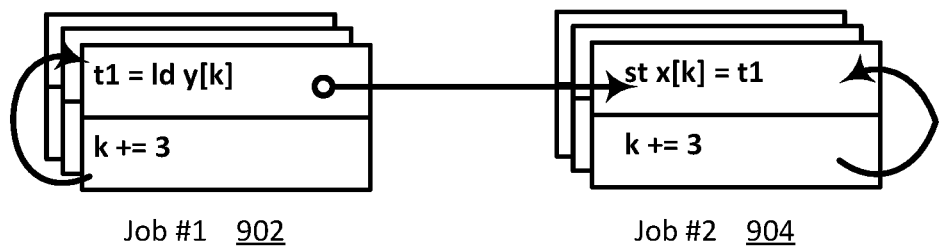
FIG. 9 is pseudocode and a block diagram illustrating a loop being decomposed into multiple jobs, according to some embodiments.

FIG. 9 is pseudocode and a block diagram of a loop being decomposed into multiple jobs, according to some embodiments. As shown, loop 900 is divided into job #1 902 and job #2 904. As an example, Stage Creation Rule #2 is applied to loop-carried dependency between memory load 'LD' instruction of job #1 902 and memory store 'ST' instruction of job #2 904.

Exemplary Stage Creation Rule #3

In some embodiments, a third stage creation rule calls for distributing the rest of the instructions among stages in a way to minimize cyclic dependencies between stages. Instructions can be replicated into several stages in order to decrease number of cross-stage data flows and dependences.

Exemplary Stage Creation Rule #4

In some embodiments, a fourth stage creation rule calls for placing each loop recurrence into a stage as a whole.

Exemplary Stage Creation Rule #5

In some embodiments, a fifth stage creation rule calls for each inner loop being placed in a stage as a whole.

Exemplary Stage Creation Rule #6

The exemplary Stage Creation Rules described above are to be used in some of the embodiments described herein. But additional stage Creation Rules can be implemented and applied in other embodiments. In some embodiments, a sixth stage creation rule calls for seeking opportunities to group jobs into stages so as to achieve at least one of maximizing utilization of the plurality of execution circuits, minimizing idle time of identifying and accelerating a dominant critical recurrent dependence chain (if any), any of the plurality of execution circuits, reducing a number of dependences among strands, balancing execution rates of the plurality of strands, and otherwise improving loop performance and power utilization.

Exemplary Strand Creation Rules

In various embodiments, one or more rules are applied for assigning jobs to strands. The various embodiments of strand creation rules described below attempt to achieve at least one of identifying and accelerating a dominant critical recurrent dependence chain (if any), maximizing utilization of the plurality of execution circuits, minimizing idle time of any of the plurality of execution circuits, reducing a number of dependences among strands, balancing execution rates of the plurality of strands, and otherwise improving loop performance and power utilization.

Exemplary Strand Creation Rule #1

In some embodiments, a first strand creation rule calls for balancing rates of all formed jobs in a loop nest (tries to equalize them). First, best possible (theoretical) rate of loop execution is calculated (in terms of "number of clocks per one iteration") basing on analysis of existing loop recurrences and per-iteration hardware resources (execution units, MOB occupancy etc.).

Corresponding rates for inner loops are calculated as: RATE_INNER=RATE_OUTER/ITERS_NUM_INNER, where RATE_INNER is an execution rate of inner loop, RATE_OUTER is execution rate of outer loop; and ITERS_NUM_INNER is estimation of iteration number for inner loop (its trip count).

Exemplary Strand Creation Rule #2

In some embodiments, a second strand creation rule calls for assigning a minimal number of strands to instructions that can be executed in parallel on an iteration level. The minimal number of strands is calculated as: STRANDS_NUM=ITER_TIME/RATE, where STRANDS_NUM is the minimal number of strands that can be assigned to a job, ITER_TIME is the amount of time used for execution of one iteration of that job by one strand, and RATE is the execution rate of a loop to which that job belongs. So, STRANDS_NUM or more strands are given to such jobs. This assignment ensures that a job will comply with execution rate of the whole pipeline. For example, in FIG. 9 both jobs have the same number of strands (3) since their ITER_TIME values are the same (2 clocks).

Exemplary Strand Creation Rule #3

In some embodiments, a third strand creation rule calls for when a job cannot be parallelized on iteration level, then only one strand is given to it. In some embodiments, in order to comply with execution rate of the whole pipeline the following rule is met: ITER_TIME<<=RATE, where ITER_TIME is amount of time needed for execution of one iteration of that job by one strand, and RATE is the execution rate of loop to which that job belongs. In some embodiments, when this rule is violated, some modification is introduced in order to balance it (e.g. assigning more than one strand to a job performing critical recurrence if critical path is not met with just one strand assigned). For example, to job #1 602 on FIG. 6 only one strand is given.

Exemplary Strand Creation Rule #4

In some embodiments, a fourth strand creation rule calls for, when there are not enough strands to ensure proper rate for all jobs then pipeline can be reformed and/or execution rate of a loop can be slowed down. If a loop is recurrence-bound, then that critical recurrence is sped up to a limit by split to separate jobs, if loop is resource-bounded then hardware is kept busy by lots of strands running in parallel. In both cases one of two natural limiters of execution speed is met.

Exemplary Strand Creation Rule #5

The exemplary Strand Creation Rules described above are to be used in some of the embodiments described herein. But additional Strand Creation Rules can be implemented and applied in other embodiments. In some embodiments, a fifth stage creation rule calls for seeking opportunities to assign jobs to strands so as to achieve at least one of identifying and accelerating a dominant critical recurrent dependence chain (if any), maximizing utilization of the plurality of execution circuits, minimizing idle time of any of the plurality of execution circuits, reducing a number of dependences among strands, balancing execution rates of the plurality of strands, and otherwise improving loop performance and power utilization.

Strand Operational Flow

Figure 10:
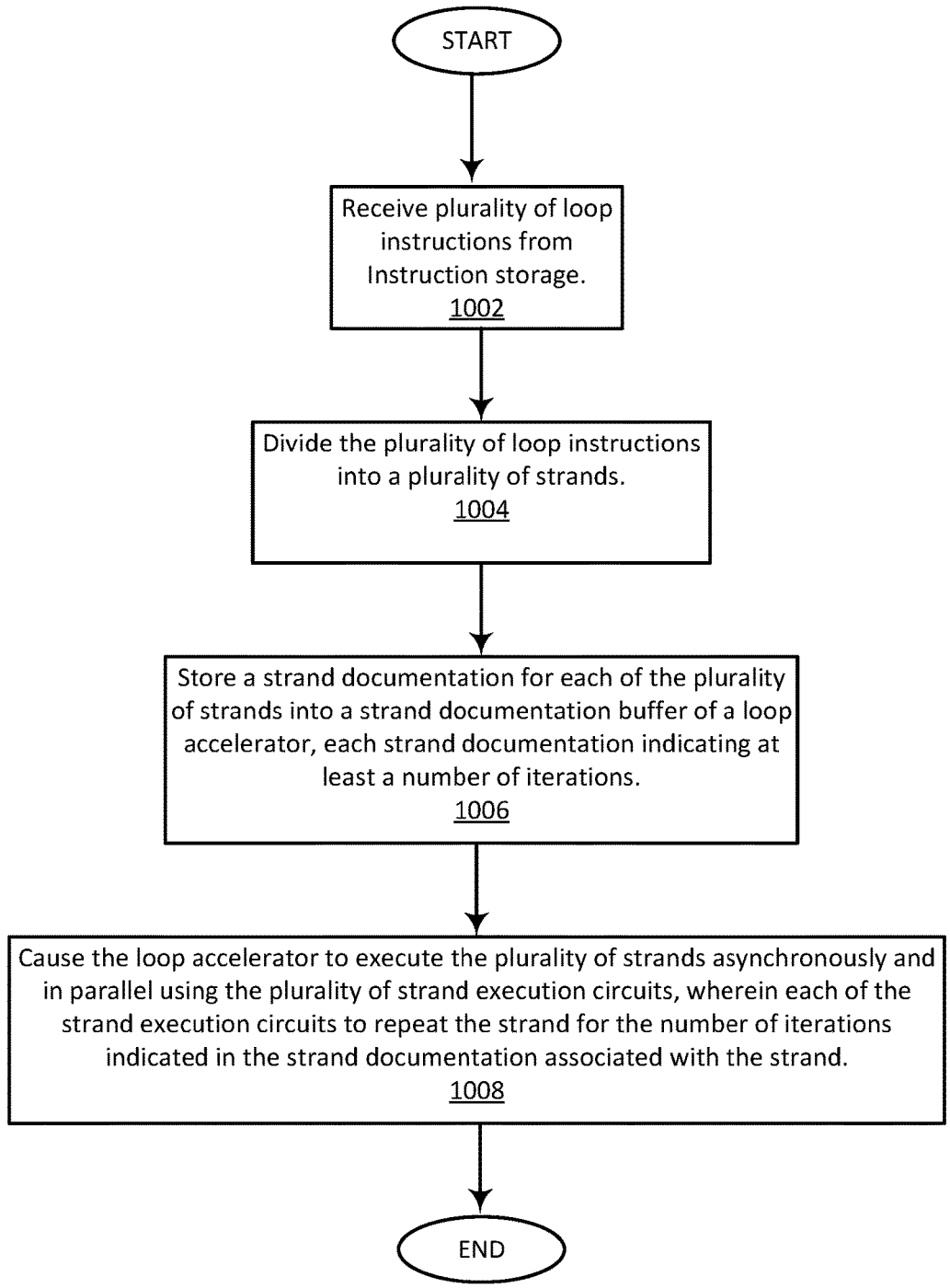
FIG. 10 is a flow diagram of a process to be performed by a binary translator to support counted loop exits in a multi-strand loop processor, according to some embodiments.

FIG. 10 is a flow diagram of a process to be performed by a binary translator to support counted loop exits in a multi-strand loop processor, according to some embodiments. After starting, at 1002, the binary translator is to receive a plurality of loop instructions from instruction storage. At 1004, the binary translator is to divide the plurality of loop instructions into a plurality of strands. At 1006, the binary translator is to initialize and store a strand documentation for each of the plurality of strands into a strand documentation buffer of a loop accelerator, each strand documentation indicating at least a number of iterations. At 1008, the binary translator is to cause the loop accelerator to execute the plurality of strands asynchronously and in parallel using the plurality of strand execution circuits, wherein each of the strand execution circuits is to repeat the strand for the number of iterations indicated in the strand documentation associated with the strand.

Strand-Control Instructions

In some embodiments, the binary translator is to insert strand-control instructions in translated program code to be executed by the loop accelerator. The instructions, including START_STRANDS, CONFIGURE_STRAND, ADVANCE_STRAND_DOCUMENTATION, and COUNTED_EXIT_BRANCH, affect how the loop accelerator manages execution of the strands.

START_STRANDS: In some embodiments, all strands which are needed for loop execution are created by means of a START_STRANDS instruction. For each generated strand this instruction sets the following fields in the strand documentation: 1) Instruction Pointer (IP), and 2) Iteration Number. So, after execution of START_STRANDS instructions all strands know the IP and Iteration number to start executing from.

CONFIGURE_STRAND: In some embodiments, the first instruction to be executed by each strand is CONFIGURE_STRAND, which sets the following fields in the strand documentation: 1) Register Bases, 2) Loop Exit Counter, and 3) Program Order.

ADVANCE_STRAND_DOCUMENTATION: In some embodiments, when a strand finishes executing an iteration, it executes instruction ADVANCE_STRAND_DOCUMENTATION and jumps to execution of next iteration which is assigned to it. This instruction advances the strand documentation pointing to next iteration, and sets the following fields: 1) Iteration Number, 2) Register Bases, 3) Loop Exit Counter, and 4) Program Order.

COUNTED_EXIT_BRANCH, in some embodiments, is to be called by a strand at every loop iteration in order to check the value of LOOP_EXIT_FLAG and perform exit if it is set.

Strand Initialization

Figure 11A:
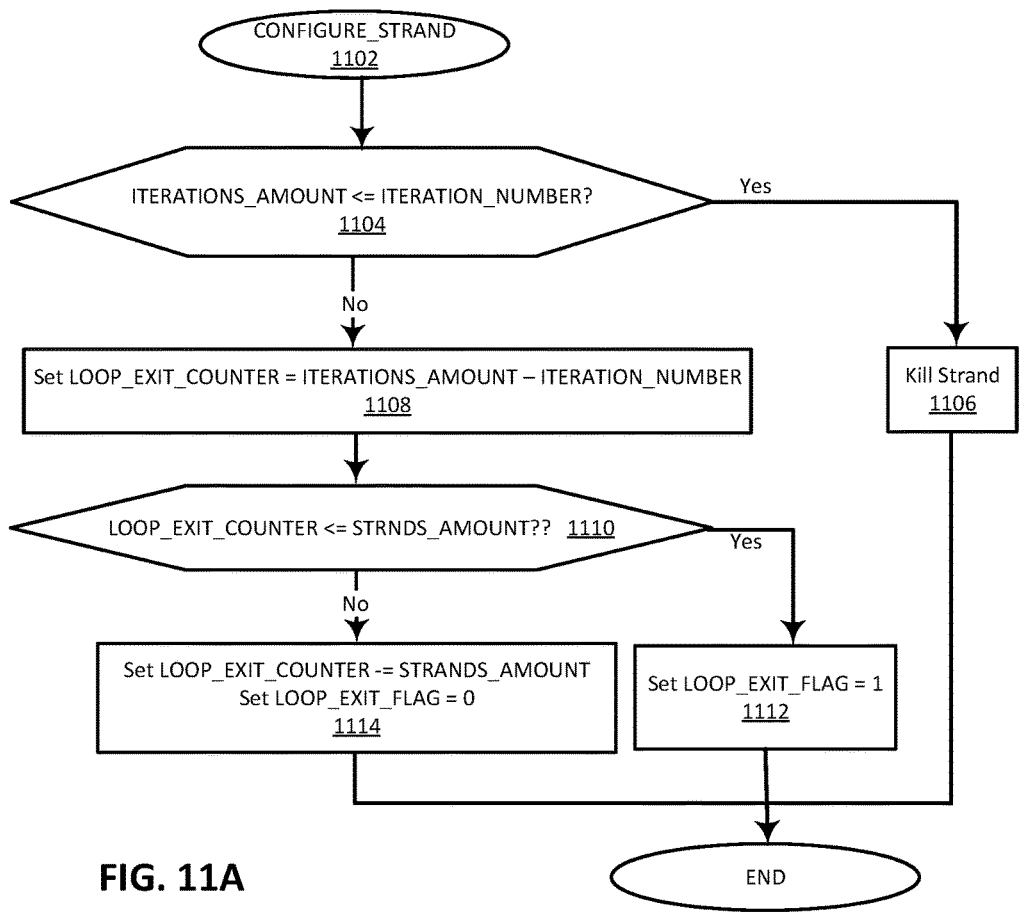
FIG. 11A is a flow diagram of a process to be performed by a loop accelerator to configure one or more loop strands, according to some embodiments.

FIG. 11A is a flow diagram of a process to be performed by a loop accelerator to configure one or more loop strands, according to some embodiments. At 1102, a CONFIGURE_STRAND instruction is inserted by a binary translator, as described with reference to FIG. 10, and executed by the loop accelerator. This instruction is located before first instruction of a loop, and performs the following actions: At 1104, it is determined whether ITERATIONS_AMOUNT<=ITERATION_NUMBER. If so, at 1106, the strand is killed because it is not needed for loop execution. Otherwise, at 1108, LOOP_EXIT_COUNTER is to be set to ITERATIONS_AMOUNT-ITERATION_NUMBER. At 1110, it is to be determined whether LOOP_EXIT_COUNTER is less than or equal to STRANDS_AMOUNT. If so, at 1112, the LOOP_EXIT_FLAG is set to 1. And if not, then LOOP_EXIT_COUNTER is to be decremented by STRANDS_AMOUNT and LOOP_EXIT_FLAG is to be set to zero.

As used herein, ITERATIONS_AMOUNT is amount of loop iterations according to counted exit (there can be other exits in loop with different amount of iterations, but they don't affect processing of counted exit). This value is given to CONFIGURE_STRAND as an argument.

As used herein, ITERATION_NUMBER is a field of Strand documentation holding number of loop iteration which is going to be executed by a strand (starting from 0).

As used herein, STRANDS_AMOUNT is amount of strands executing the same loop (stage of a pipeline) in parallel. Strands executing the same code works with iterations in an interleaving manner. For example, if two strands execute the same code for different iterations then first stand works with all odd iterations while second strand works with all even iterations.

Strand Progression

In operation, according to some embodiments disclosed herein, the loop accelerator is to execute the set of instructions included in a strand. Upon completion of an iteration, the LOOP_EXIT_FLAG field of the strand documentation is to be checked to determine whether loop exit should be taken. If LOOP_EXIT_FLAG=1 then exit should be taken.

In some embodiments, an instruction, COUNTED_EXIT_BRANCH, is to be called at every iteration to check the value of LOOP_EXIT_FLAG and to perform exit if it is set.

Strand Iteration Completion

Figure 11B:
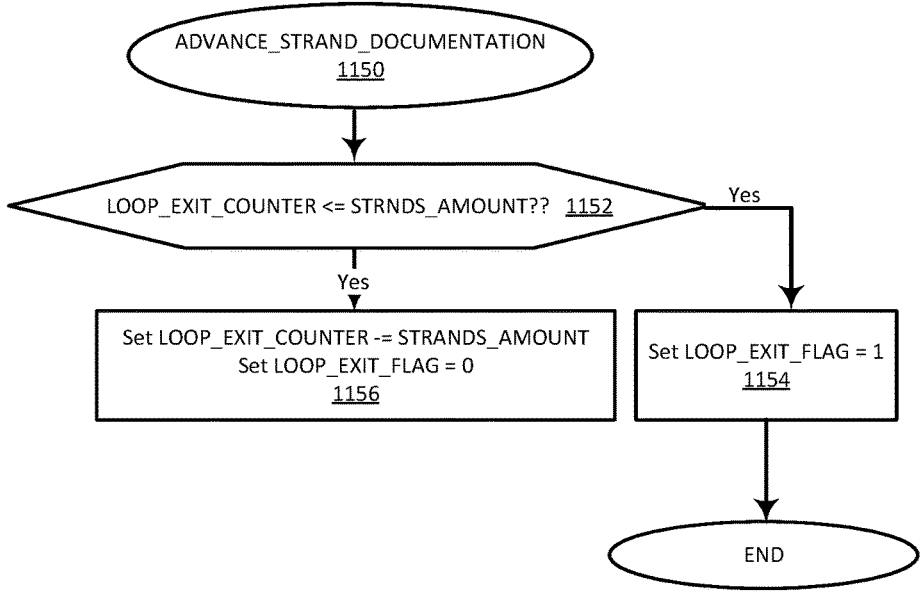
FIG. 11B is a flow diagram of a process to be performed by a loop accelerator to advance a stand documentation, according to some embodiments.

FIG. 11B is a flow diagram of a process to be performed by a loop accelerator to advance a strand documentation, according to some embodiments. As shown, an ADVANCE_STRAND_DOCUMENTATION instruction is to be called at 1150, as by a loop strand that has finished execution of an iteration. At 1152, it is to be determined whether LOOP_EXIT_COUNTER is less than or equal to STRANDS_AMOUNT. If so, at 1154, the LOOP_EXIT_FLAG is set to 1. And if not, then at 1156, LOOP_EXIT_COUNTER is to be set to LOOP_EXIT_COUNTER minus STRANDS_AMOUNT and LOOP_EXIT_FLAG is to be set to zero. In some embodiments, the loop accelerator jumps to executing the next iteration to which it is assigned.

Dynamic Verification

For a loop that has counted exit, it is sometimes not possible to utilize a hardware counter. The simplest example is the case when the calculated iterations number does not fit into data format of target architecture. So, in general case if a loop has counted exit, a possibility of correct pass of iteration number to a special hardware register (LOOP_EXIT_COUNTER) should be provided to enable hardware counter utilization. Let's call a process of determining of hardware counter utilization possibility for a loop as process of iteration number validation (or just validation). In a case of successful static (compile-time) validation, the problem of hardware counter utilization can be solved at the compilation stage by a binary translator. The only thing to be ensured is correct pass of iteration number to the hardware counter before loop execution.

Figure 12A:
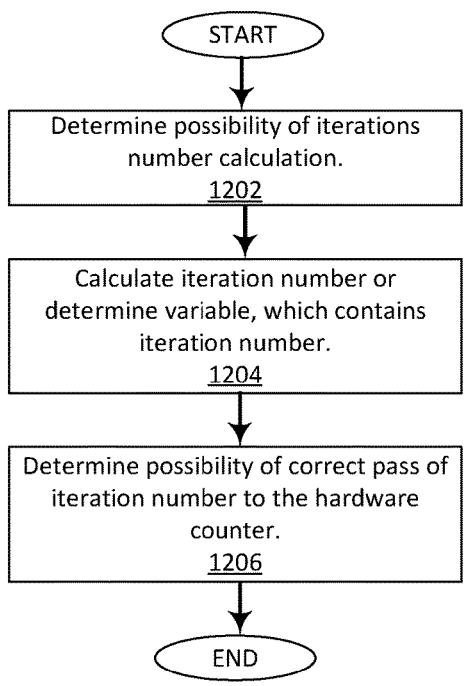
FIGS. 12A-12C are block flow diagrams of processes to be performed by a binary translator and processor to exploit advantages of hardware-supported loops, according to some embodiments.
Figure 12B:
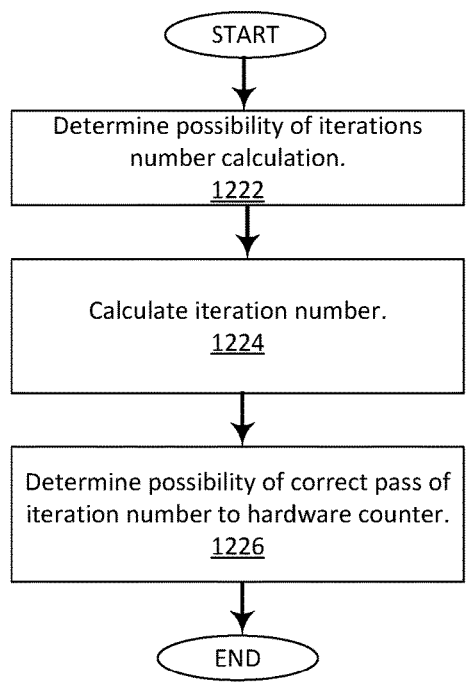
Figure 12C:
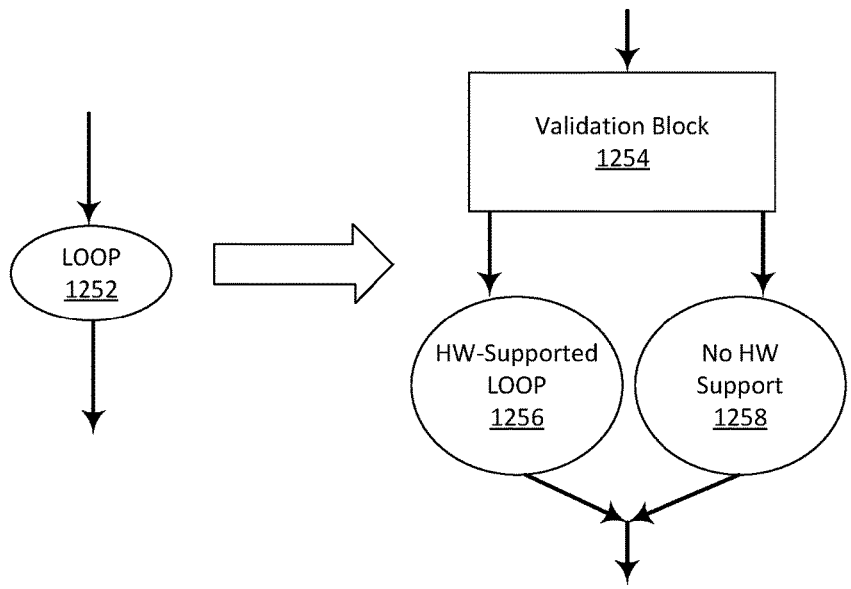

FIGS. 12A-12C are block flow diagrams of processes to be performed by a binary translator and processor to exploit advantages of hardware-supported loops, according to some embodiments. At 1202, it is determined whether it is possible to calculate a number of iterations. At 1204, an iteration number is calculated, or a variable containing an iteration number is determined. At 1206, it is determined whether it is possible to correctly pass an iteration number to a hardware counter. However, in some cases static validation reports impossibility of hardware counter utilization, thereby leading to less effective loop execution. For instance, this can happen when loop parameters, which determine an iteration number, are statically undefined. In particular, this behavior sometimes occurs in binary translation where high-level descriptions of variables used in source code is absent.

Embodiments disclosed herein make it possible to utilize a hardware counter in some cases, when static validation reports impossibility of hardware counter utilization. Embodiments disclosed herein thus extend hardware counter usage.

Embodiments disclosed herein allow hardware counter support enabling in case of static validation failure. Embodiments disclosed herein dynamically validate hardware counter utilization possibility. Enabling of hardware counter support depends on result of this validation. The scheme of validation construction is shown in FIG. 1.

Two versions of a loop are constructed. Selection of a version for execution is done by validation code.

FIG. 12B is a flow diagram of determinations to be made by a dynamic validation process per each loop instantiation with potentially different iteration numbers. At 1222, it is to be determined whether it is possible to calculate an iteration number. At 1224, an iteration number is to be calculated. At 1226, it is to be determined whether it is possible to correctly pass the calculated iteration number to a hardware counter.

In some embodiments, a validation flow as in FIG. 12B is to be conducted, and, in the case of successful validation, execution passes to a hardware-supported version of the loop. Otherwise, execution is to pass to another version of the loop. Thus, in a first, hardware-supported loop version, the calculated iteration number can be used for hardware counter utilization.

FIG. 12C is a block flow diagram of a process to be performed by a processor to exploit advantages of hardware-supported loops, according to some embodiments. At 1254, a validation block determines, for example by applying the process of FIG. 12B, above, to loop instructions 1252, whether a hardware-supported loop version is possible. If so, a hardware-supported loop is executed at 1256. But if not, the loop is to be executed without hardware-support at 1258. A hardware-supported version of the loop is prepared by a binary translator.

As used herein, a loop having hardware support means that some additional hardware facilities are provided to the loop, such as special fields in a strand documentation and corresponding circuitry to handle them. A loop that is not provided with hardware support, on the other hand, is to use a loop provided by an instruction set architecture of the processor, and hardware assistance described above are not provided or utilized. Every iteration calculates exit condition asynchronously with similar conditions at other iterations. Redundant speculative iterations (logically located after point where execution leaves the loop) will be discarded by special HW events caused by instruction at loop exits (outside of loop body).

Figure 13:
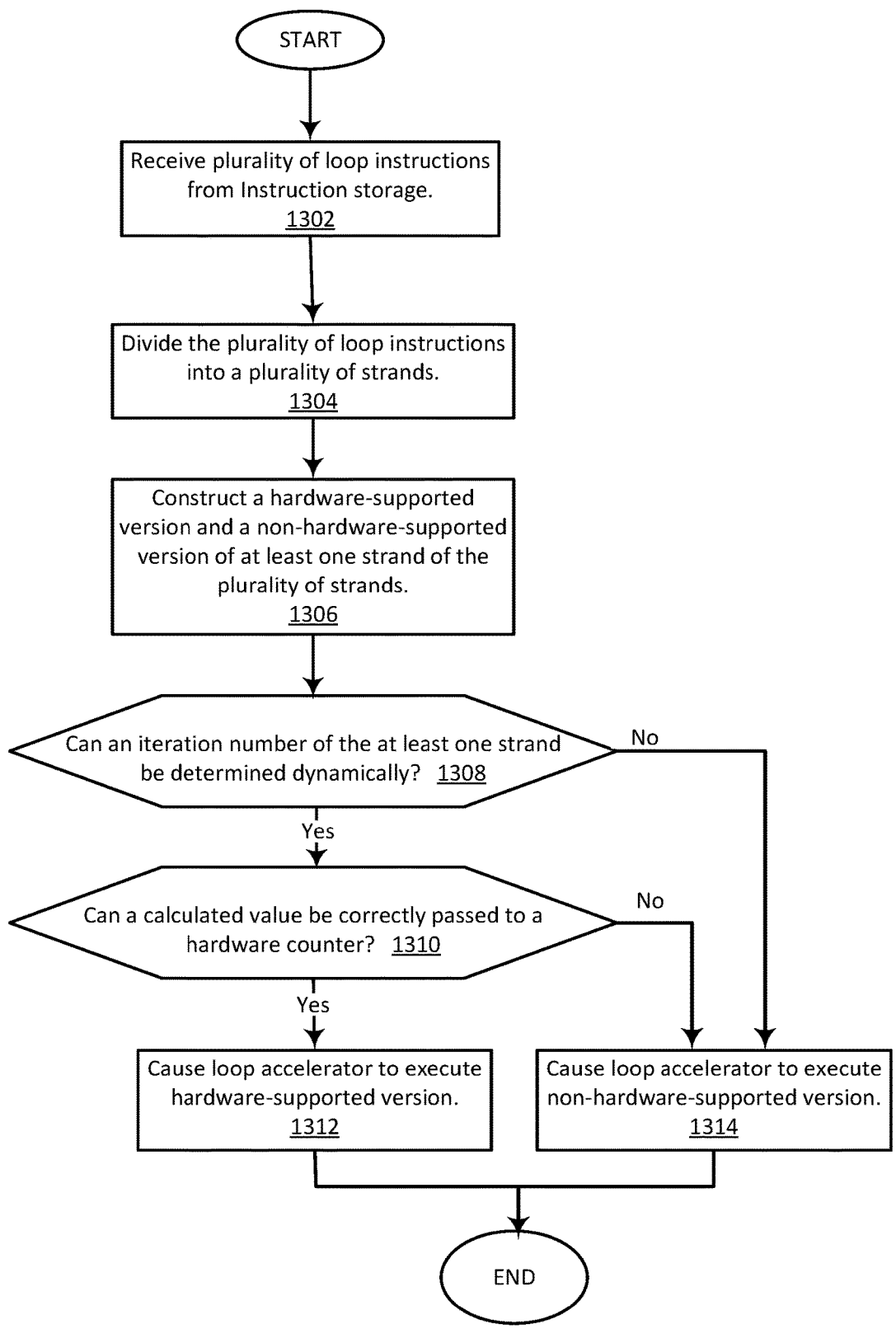
FIG. 13 is a flow diagram of a process to be performed by a binary translator to determine whether to implement a hardware-supported or a non-hardware-supported loop, according to some embodiments.

FIG. 13 is a flow diagram of a process to be performed by a binary translator to determine whether to implement a hardware-supported or a non-hardware-supported loop, according to some embodiments. After starting, at 1302, a plurality of loop instructions is received from instruction storage. At 1304, the binary translator is to divide the plurality of loop instructions into a plurality of strands. In so doing, in some embodiments, the binary translator is to apply at least one strand creation rule, as described above. At 1306, the binary translator is to construct a hardware-supported version of the loop and a non-hardware-supported version of at least one strand of the plurality of strands. At 1308, the binary translator is to determine whether an iteration number of the at least one strand can be determined dynamically and, at 1310, the binary translator is to determine whether a calculated value can be correctly passed to a hardware counter. If the answers to the determinations at 1308 and 1310 are both affirmative, at 1312, the binary translator is to execute a hardware-supported version of the loop. Otherwise, if at least one of the determinations at 1308 and 1310 is negative, the binary translator, at 1314, is to cause the loop accelerator to execute a non-hardware-supported version of the loop. The process then ends.

Figure 14:
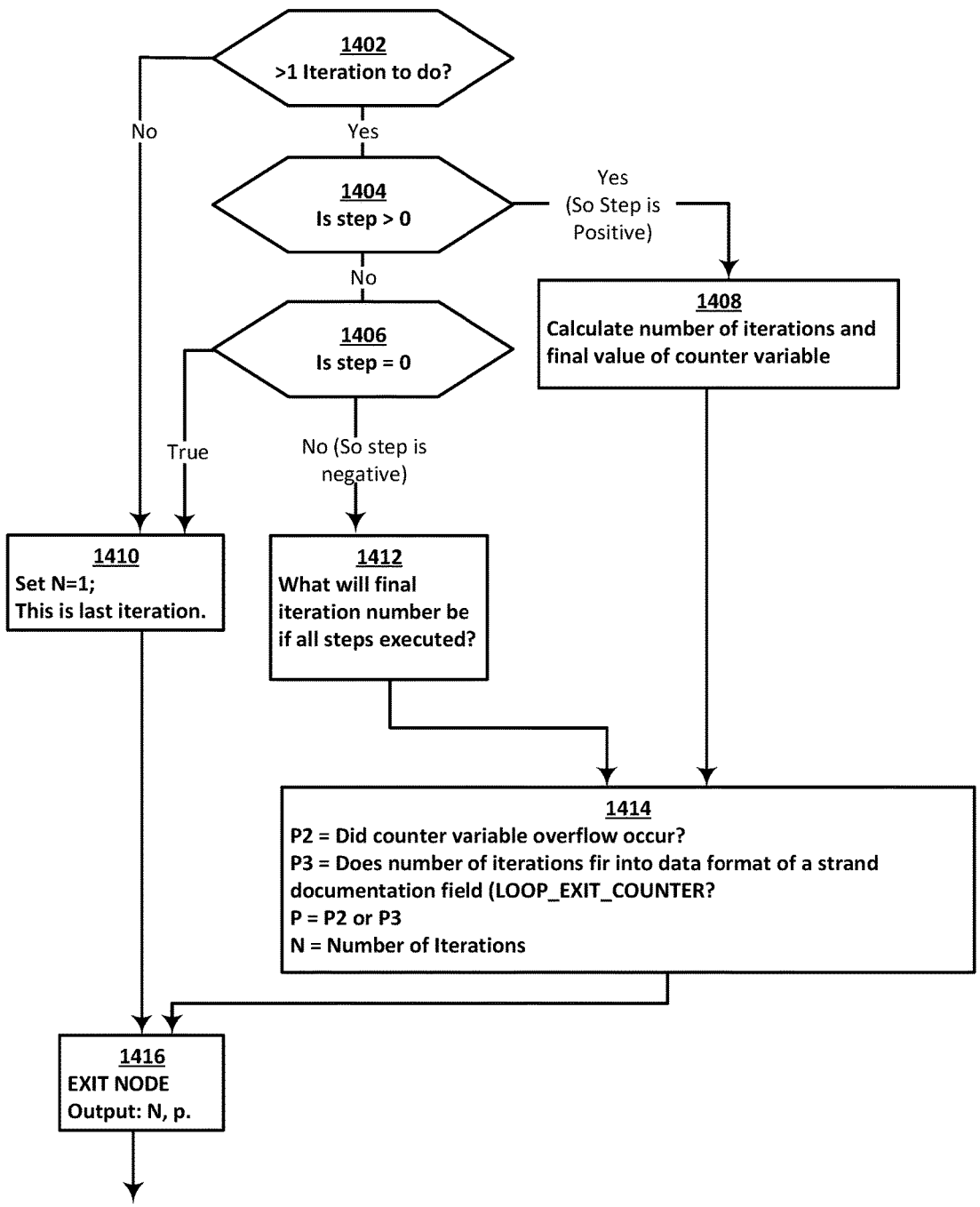
FIG. 14 is a block flow diagram of a dynamic process to be performed by a processor including a loop accelerator to dynamically validate the use of hardware support for a loop instance, according to some embodiments.
Figure 15:
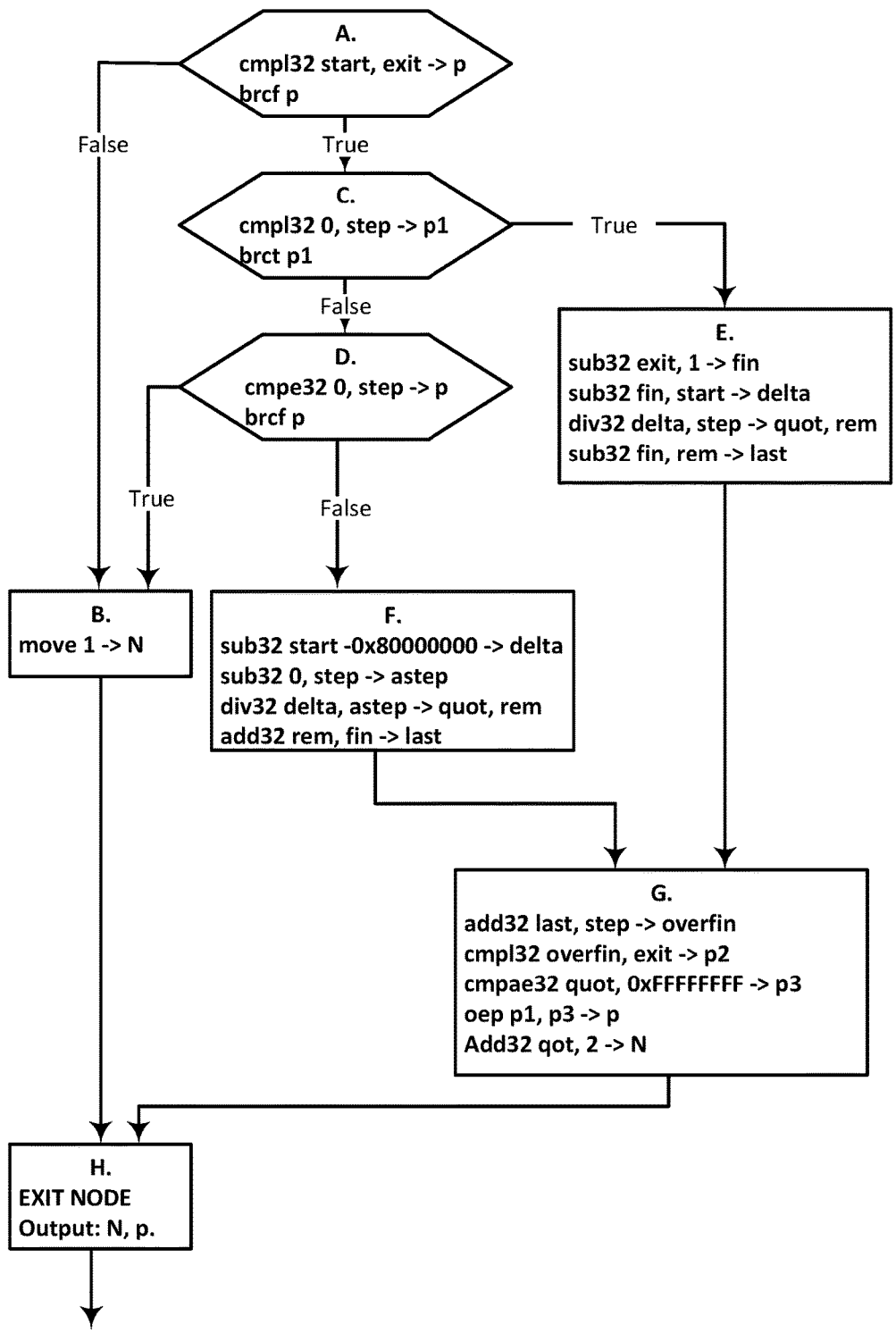
FIG. 15 is a block flow diagram illustrating exemplary assembly instructions inserted into loop code by a binary translator, according to some embodiments.

FIG. 14 is a block flow diagram of a dynamic process to be performed by a processor including a loop accelerator to validate the use of hardware support for a loop instance, according to some embodiments. As a result of this validation, two values are expected at step 1416: "P"—a predicate to make a selection between hardware-supported loop version and ordinary loop version, and "N"—correct number of iterations to be placed into LOOP_EXIT_COUNTER field of strand documentation. As shown, at 1402, the processor is to determine whether there is more than one iteration to do. If not, at 1410, the processor sets N equal to 1 and this is the last iteration. But if so, at 1404 it is determined whether step is greater than zero. If so, at 1408, the number of iterations particular to the loop instance and the final loop counter value are calculated. But, if it is determined at 1404 that step is not greater than zero, at 1406 it is checked whether step is zero. If so, at 1410, the processor sets N equal to 1 and this is the last iteration. But if it is determined at 1406 that step is negative, at 1412, the processor calculates what the final iteration number will be if all steps are executed. At 1414, the processor determines and provides an overall control predicate "P," as a logical combination of two predicates "P2" or "P3", indicating that a counter variable overflow occurred, P3, indicating that the number of profiles does not fit a data format of strand documentation field. The binary translator can statically generate binary code performing this block flow of dynamic checks as depicted in FIG. 15 in terms of particular assembly instructions inserted before the loop versions.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an instruction set architecture (ISA) is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 16A:
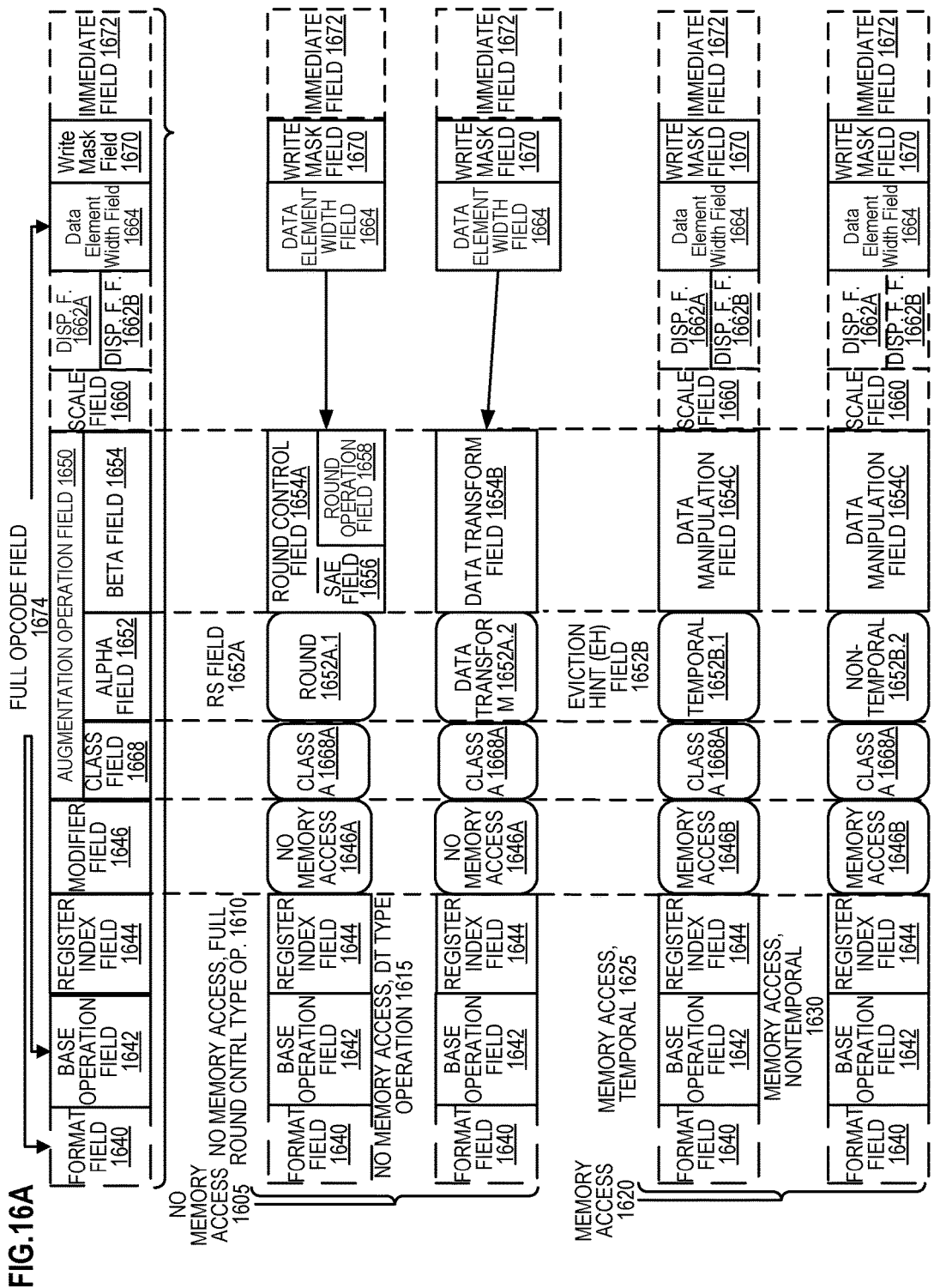
FIGS. 16A-16B are block diagrams illustrating a generic vector friendly instruction format and instruction templates thereof according to embodiments of the invention.
Figure 16B:
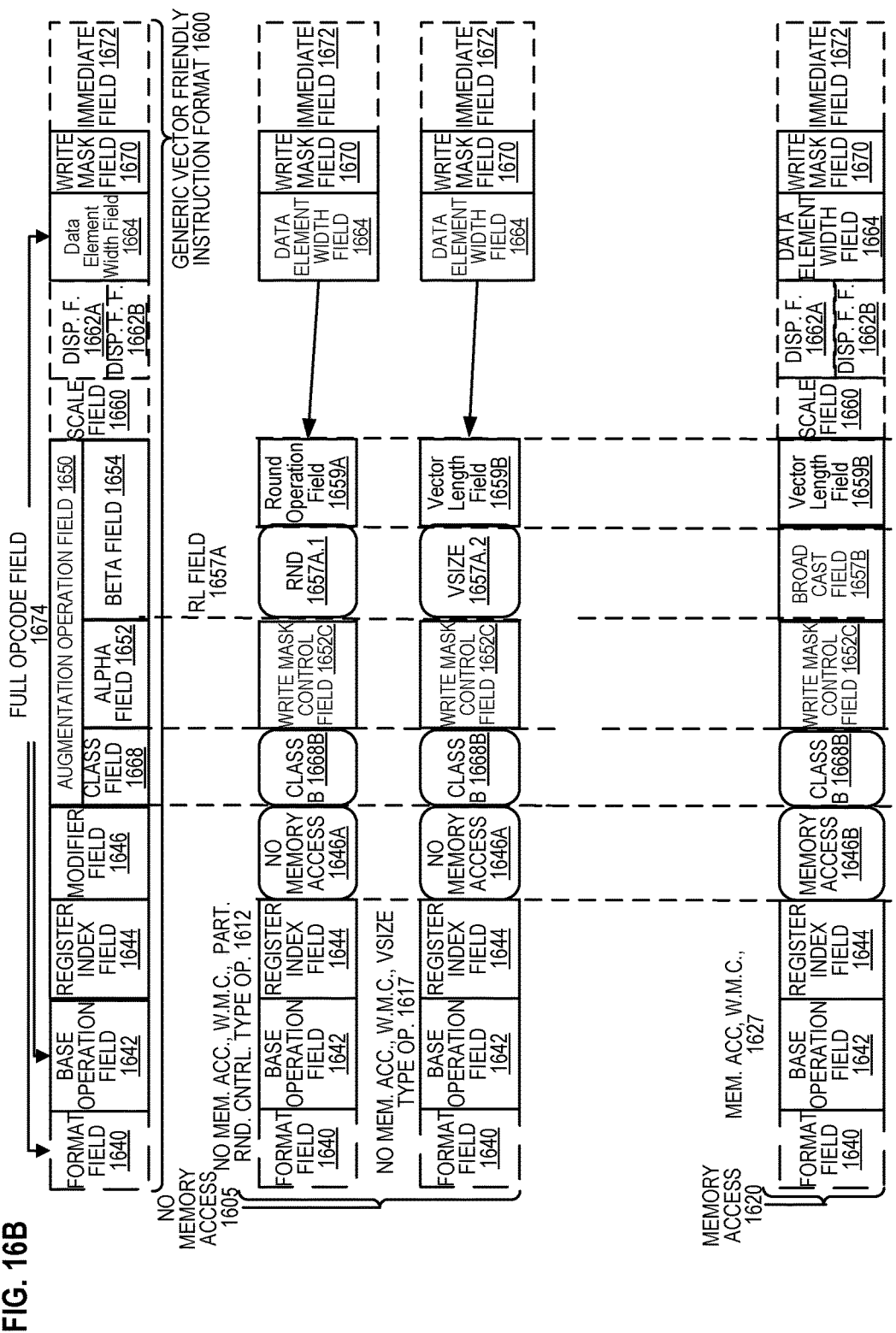

FIGS. 16A-16B are block diagrams illustrating a generic vector friendly instruction format and instruction templates thereof according to embodiments of the invention. FIG. 16A is a block diagram illustrating a generic vector friendly instruction format and class A instruction templates thereof according to embodiments of the invention; while FIG. 16B is a block diagram illustrating the generic vector friendly instruction format and class B instruction templates thereof according to embodiments of the invention. Specifically, a generic vector friendly instruction format 1600 for which are defined class A and class B instruction templates, both of which include no memory access 1605 instruction templates and memory access 1620 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 16A include: 1) within the no memory access 1605 instruction templates there is shown a no memory access, full round control type operation 1610 instruction template and a no memory access, data transform type operation 1615 instruction template; and 2) within the memory access 1620 instruction templates there is shown a memory access, temporal 1625 instruction template and a memory access, non-temporal 1630 instruction template. The class B instruction templates in FIG. 16B include: 1) within the no memory access 1605 instruction templates there is shown a no memory access, write mask control, partial round control type operation 1612 instruction template and a no memory access, write mask control, vsize type operation 1617 instruction template; and 2) within the memory access 1620 instruction templates there is shown a memory access, write mask control 1627 instruction template.

The generic vector friendly instruction format 1600 includes the following fields listed below in the order illustrated in FIGS. 16A-16B.

Format field 1640—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1642—its content distinguishes different base operations.

Register index field 1644—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1646—its content distinguishes occurrences of instructions in the generic vector instruction format that specify memory access from those that do not; that is, between no memory access 1605 instruction templates and memory access 1620 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1650—its content distinguishes which one of a variety of different operations to be performed in addition to the base operation. This field is context specific. In one embodiment of the invention, this field is divided into a class field 1668, an alpha field 1652, and a beta field 1654. The augmentation operation field 1650 allows common groups of operations to be performed in a single instruction rather than 2, 3, or 4 instructions.

Scale field 1660—its content allows for the scaling of the index field's content for memory address generation (e.g., for address generation that uses $2^{scale}*index+base$).

Displacement Field 1662A—its content is used as part of memory address generation (e.g., for address generation that uses $2^{scale}*index+base+displacement$).

Displacement Factor Field 1662B (note that the juxtaposition of displacement field 1662A directly over displacement factor field 1662B indicates one or the other is used)— its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1674 (described later herein) and the data manipulation field 1654C. The displacement field 1662A and the displacement factor field 1662B are optional in the sense that they are not used for the no memory access 1605 instruction templates and/or different embodiments may implement only one or none of the two.

Data element width field 1664—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1670—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1670 allows for partial vector operations, including loads, stores, arithmetic, logical, etc. While embodiments of the invention are described in which the write mask field's 1670 content selects one of a number of write mask registers that contains the write mask to be used (and thus the write mask field's 1670 content indirectly identifies that masking to be performed), alternative embodiments instead or additional allow the mask write field's 1670 content to directly specify the masking to be performed.

Immediate field 1672—its content allows for the specification of an immediate. This field is optional in the sense that is it not present in an implementation of the generic vector friendly format that does not support immediate and it is not present in instructions that do not use an immediate.

Class field 1668—its content distinguishes between different classes of instructions. With reference to FIGS. 16A-B, the contents of this field select between class A and class B instructions. In FIGS. 16A-B, rounded corner squares are used to indicate a specific value is present in a field (e.g., class A 1668A and class B 1668B for the class field 1668 respectively in FIGS. 16A-B).

Instruction Templates of Class A

In the case of the non-memory access 1605 instruction templates of class A, the alpha field 1652 is interpreted as an RS field 1652A, whose content distinguishes which one of the different augmentation operation types are to be performed (e.g., round 1652A.1 and data transform 1652A.2 are respectively specified for the no memory access, round type operation 1610 and the no memory access, data transform type operation 1615 instruction templates), while the beta field 1654 distinguishes which of the operations of the specified type is to be performed. In the no memory access 1605 instruction templates, the scale field 1660, the displacement field 1662A, and the displacement scale filed 1662B are not present.

No-Memory Access Instruction Templates—Full Round Control Type Operation

In the no memory access, full round control type operation 1610 instruction template, the beta field 1654 is interpreted as a round control field 1654A, whose content(s) provide static rounding. While in the described embodiments of the invention the round control field 1654A includes a suppress all floating point exceptions (SAE) field 1656 and a round operation control field 1658, alternative embodiments may support may encode both these concepts into the same field or only have one or the other of these concepts/fields (e.g., may have only the round operation control field 1658).

SAE field 1656—its content distinguishes whether or not to disable the exception event reporting; when the SAE field's 1656 content indicates, suppression is enabled, a given instruction does not report any kind of floating-point exception flag and does not raise any floating point exception handler.

Round operation control field 1658—its content distinguishes which one of a group of rounding operations to perform (e.g., Round-up, Round-down, Round-towards-zero and Round-to-nearest). Thus, the round operation control field 1658 allows for the changing of the rounding mode on a per instruction basis. In one embodiment of the invention where a processor includes a control register for specifying rounding modes, the round operation control field's 1650 content overrides that register value.

No Memory Access Instruction Templates—Data Transform Type Operation

In the no memory access data transform type operation 1615 instruction template, the beta field 1654 is interpreted as a data transform field 1654B, whose content distinguishes which one of a number of data transforms is to be performed (e.g., no data transform, swizzle, broadcast).

In the case of a memory access 1620 instruction template of class A, the alpha field 1652 is interpreted as an eviction hint field 1652B, whose content distinguishes which one of the eviction hints is to be used (in FIG. 16A, temporal 1652B.1 and non-temporal 1652B.2 are respectively specified for the memory access, temporal 1625 instruction template and the memory access, non-temporal 1630 instruction template), while the beta field 1654 is interpreted as a data manipulation field 1654C, whose content distinguishes which one of a number of data manipulation operations (also known as primitives) is to be performed (e.g., no manipulation; broadcast; up conversion of a source; and down conversion of a destination). The memory access 1620 instruction templates include the scale field 1660, and optionally the displacement field 1662A or the displacement scale field 1662B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1652 is interpreted as a write mask control (Z) field 1652C, whose content distinguishes whether the write masking controlled by the write mask field 1670 should be a merging or a zeroing.

In the case of the non-memory access 1605 instruction templates of class B, part of the beta field 1654 is interpreted as an RL field 1657A, whose content distinguishes which one of the different augmentation operation types are to be performed (e.g., round 1657A.1 and vector length (VSIZE) 1657A.2 are respectively specified for the no memory access, write mask control, partial round control type operation 1612 instruction template and the no memory access, write mask control, VSIZE type operation 1617 instruction template), while the rest of the beta field 1654 distinguishes which of the operations of the specified type is to be performed. In the no memory access 1605 instruction templates, the scale field 1660, the displacement field 1662A, and the displacement scale filed 1662B are not present.

In the no memory access, write mask control, partial round control type operation 1610 instruction template, the rest of the beta field 1654 is interpreted as a round operation field 1659A and exception event reporting is disabled (a given instruction does not report any kind of floating-point exception flag and does not raise any floating point exception handler).

Round operation control field 1659A—just as round operation control field 1658, its content distinguishes which one of a group of rounding operations to perform (e.g., Round-up, Round-down, Round-towards-zero and Round-to-nearest). Thus, the round operation control field 1659A allows for the changing of the rounding mode on a per instruction basis. In one embodiment of the invention where a processor includes a control register for specifying rounding modes, the round operation control field's 1650 content overrides that register value.

In the no memory access, write mask control, VSIZE type operation 1617 instruction template, the rest of the beta field 1654 is interpreted as a vector length field 1659B, whose content distinguishes which one of a number of data vector lengths is to be performed on (e.g., 128, 256, or 512 byte).

In the case of a memory access 1620 instruction template of class B, part of the beta field 1654 is interpreted as a broadcast field 1657B, whose content distinguishes whether or not the broadcast type data manipulation operation is to be performed, while the rest of the beta field 1654 is interpreted the vector length field 1659B. The memory access 1620 instruction templates include the scale field 1660, and optionally the displacement field 1662A or the displacement scale field 1662B.

With regard to the generic vector friendly instruction format 1600, a full opcode field 1674 is shown including the format field 1640, the base operation field 1642, and the data element width field 1664. While one embodiment is shown where the full opcode field 1674 includes all of these fields, the full opcode field 1674 includes less than all of these fields in embodiments that do not support all of them. The full opcode field 1674 provides the operation code (opcode).

The augmentation operation field 1650, the data element width field 1664, and the write mask field 1670 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 17A is a block diagram illustrating an exemplary specific vector friendly instruction format according to embodiments of the invention. FIG. 17A shows a specific vector friendly instruction format 1700 that is specific in the sense that it specifies the location, size, interpretation, and order of the fields, as well as values for some of those fields. The specific vector friendly instruction format 1700 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 16 into which the fields from FIG. 17A map are illustrated.

It should be understood that, although embodiments of the invention are described with reference to the specific vector friendly instruction format 1700 in the context of the generic vector friendly instruction format 1600 for illustrative purposes, the invention is not limited to the specific vector friendly instruction format 1700 except where claimed. For example, the generic vector friendly instruction format 1600 contemplates a variety of possible sizes for the various fields, while the specific vector friendly instruction format 1700 is shown as having fields of specific sizes. By way of specific example, while the data element width field 1664 is illustrated as a one bit field in the specific vector friendly instruction format 1700, the invention is not so limited (that is, the generic vector friendly instruction format 1600 contemplates other sizes of the data element width field 1664).

The generic vector friendly instruction format 1600 includes the following fields listed below in the order illustrated in FIG. 17A.

EVEX Prefix (Bytes 0-3) 1702—is encoded in a four-byte form.

Format Field 1640 (EVEX Byte 0, bits [7:0])—the first byte (EVEX Byte 0) is the format field 1640 and it contains 0x62 (the unique value used for distinguishing the vector friendly instruction format in one embodiment of the invention).

The second-fourth bytes (EVEX Bytes 1-3) include a number of bit fields providing specific capability.

REX field 1705 (EVEX Byte 1, bits [7-5])—consists of a EVEX.R bit field (EVEX Byte 1, bit [7]-R), EVEX.X bit field (EVEX byte 1, bit [6]-X), and 1657BEX byte 1, bit[5]-B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1610—this is the first part of the REX' field 1610 and is the EVEX.R' bit field (EVEX Byte 1, bit [4]-R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1715 (EVEX byte 1, bits [3:0]-mmmm)—its content encodes an implied leading opcode byte (0F, 0F 38, or 0F 3).

Data element width field 1664 (EVEX byte 2, bit [7]-W)—is represented by the notation EVEX.W. EVEX.W is used to define the granularity (size) of the datatype (either 32-bit data elements or 64-bit data elements).

EVEX.vvvv 1720 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1720 encodes the 4 low-order bits of the first source register specifier stored in inverted (1s complement) form. Depending on the instruction, an extra different EVEX bit field is used to extend the specifier size to 32 registers.

EVEX.U 1668 Class field (EVEX byte 2, bit [2]-U)—If EVEX.U=0, it indicates class A or EVEX.U0; if EVEX.U=1, it indicates class B or EVEX.U1.

Prefix encoding field 1725 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1652 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 1654 (EVEX byte 3, bits [6:4]-SSS, also known as $EVEX.s_{2-0}$, $EVEX.r_{2-0}$, EVEX.rr1, EVEX.LL0, EVEX.LLB; also illustrated with βββ)—as previously described, this field is context specific.

REX' field 1610—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1670 (EVEX byte 3, bits [2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1730 (Byte 4) is also known as the opcode byte. Part of the opcode is specified in this field.

MOD R/M Field 1740 (Byte 5) includes MOD field 1742, Reg field 1744, and R/M field 1746. As previously described, the MOD field's 1742 content distinguishes between memory access and non-memory access operations. The role of Reg field 1744 can be summarized to two situations: encoding either the destination register operand or a source register operand, or be treated as an opcode extension and not used to encode any instruction operand. The role of R/M field 1746 may include the following: encoding the instruction operand that references a memory address, or encoding either the destination register operand or a source register operand.

Scale, Index, Base (SIB) Byte (Byte 6)—As previously described, the scale field's 1650 content is used for memory address generation. SIB.xxx 1754 and SIB.bbb 1756—the contents of these fields have been previously referred to with regard to the register indexes Xxxx and Bbbb.

Displacement field 1662A (Bytes 7-10)—when MOD field 1742 contains 10, bytes 7-10 are the displacement field 1662A, and it works the same as the legacy 32-bit displacement (disp32) and works at byte granularity.

Displacement factor field 1662B (Byte 7)—when MOD field 1742 contains 01, byte 7 is the displacement factor field 1662B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1662B is a reinterpretation of disp8; when using displacement factor field 1662B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1662B substitutes the legacy x86 instruction set 8-bit displacement. Thus, the displacement factor field 1662B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1672 operates as previously described.

Full Opcode Field

FIG. 17B is a block diagram illustrating the fields of the specific vector friendly instruction format that make up the full opcode field according to one embodiment of the invention. Specifically, the full opcode field 1674 includes the format field 1640, the base operation field 1642, and the data element width (W) field 1664. The base operation field 1642 includes the prefix encoding field 1725, the opcode map field 1715, and the real opcode field 1730.

Register Index Field

FIG. 17C is a block diagram illustrating the fields of the specific vector friendly instruction format that make up the register index field according to one embodiment of the invention. Specifically, the register index field 1644 includes the REX field 1705, the REX' field 1710, the MODR/M.reg field 1744, the MODR/M.r/m field 1746, the VVVV field 1720, xxx field 1754, and the bbb field 1756.

Augmentation Operation Field

Figure 17D:
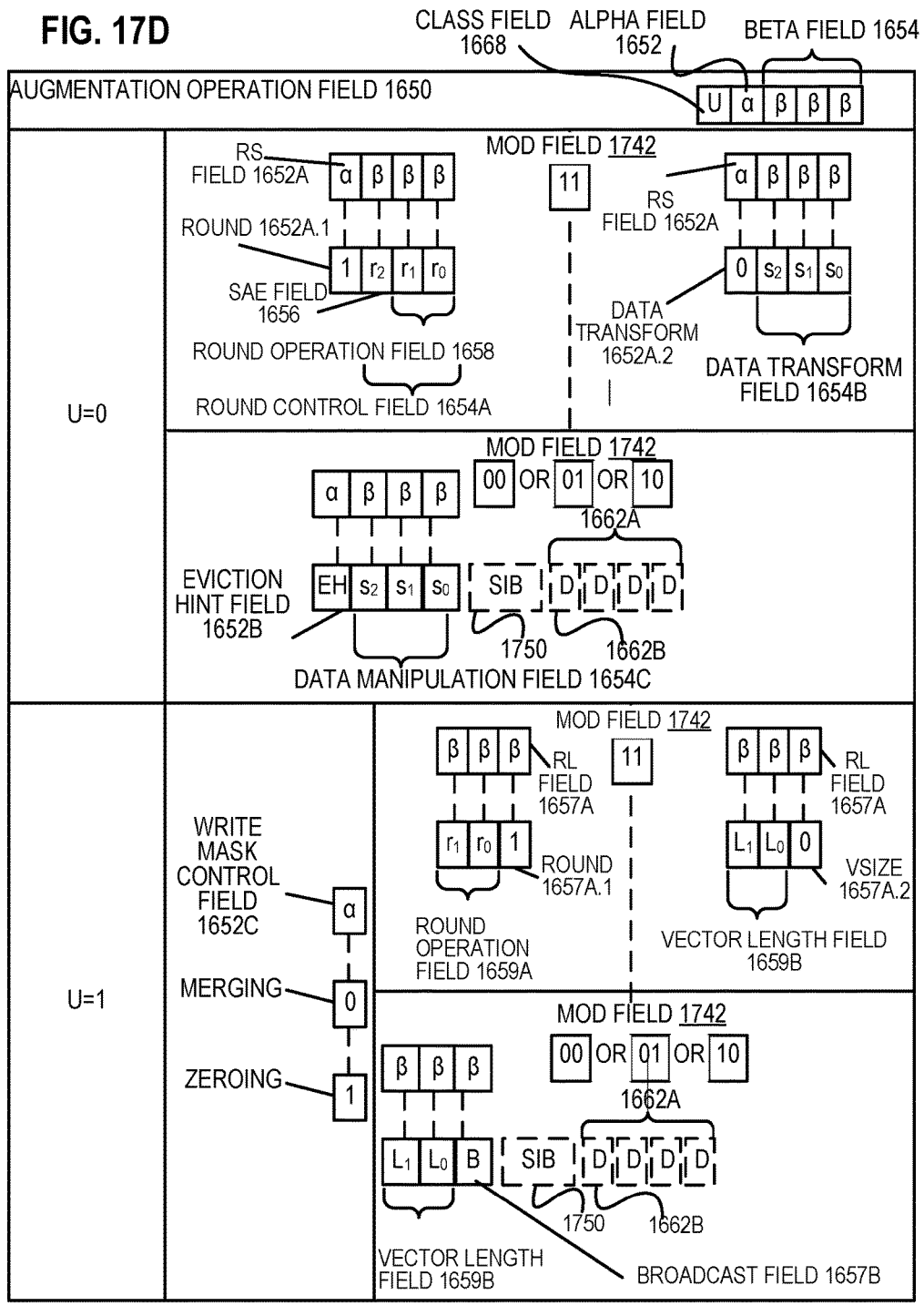
FIG. 17D is a block diagram illustrating the fields of the specific vector friendly instruction format that make up the augmentation operation field according to one embodiment of the invention.

FIG. 17D is a block diagram illustrating the fields of the specific vector friendly instruction format that make up the augmentation operation field 1650 according to one embodiment of the invention. When the class (U) field 1668 contains 0, it signifies EVEX.U0 (class A 1668A); when it contains 1, it signifies EVEX.U1 (class B 1668B). When U=0 and the MOD field 1742 contains 11 (signifying a no memory access operation), the alpha field 1652 (EVEX byte 3, bit [7]-EH) is interpreted as the rs field 1652A. When the rs field 1652A contains a 1 (round 1652A.1), the beta field 1654 (EVEX byte 3, bits [6:4]-SSS) is interpreted as the round control field 1654A. The round control field 1654A includes a one bit SAE field 1656 and a two bit round operation field 1658. When the rs field 1652A contains a 0 (data transform 1652A.2), the beta field 1654 (EVEX byte 3, bits [6:4]-SSS) is interpreted as a three bit data transform field 1654B. When U=0 and the MOD field 1742 contains 00, 01, or 10 (signifying a memory access operation), the alpha field 1652 (EVEX byte 3, bit [7]-EH) is interpreted as the eviction hint (EH) field 1652B and the beta field 1654 (EVEX byte 3, bits [6:4]-SSS) is interpreted as a three bit data manipulation field 1654C.

When U=1, the alpha field 1652 (EVEX byte 3, bit [7]-EH) is interpreted as the write mask control (Z) field 1652C. When U=1 and the MOD field 1742 contains 11 (signifying a no memory access operation), part of the beta field 1654 (EVEX byte 3, bit [4]-$S_0$) is interpreted as the RL field 1657A; when it contains a 1 (round 1657A.1) the rest of the beta field 1654 (EVEX byte 3, bit [6-5]-$S_{2-1}$) is interpreted as the round operation field 1659A, while when the RL field 1657A contains a 0 (VSIZE 1657.A2) the rest of the beta field 1654 (EVEX byte 3, bit [6-5]-$S_{2-1}$) is interpreted as the vector length field 1659B (EVEX byte 3, bit [6-5]-$L_{1-0}$). When U=1 and the MOD field 1742 contains 00, 01, or 10 (signifying a memory access operation), the beta field 1654 (EVEX byte 3, bits [6:4]-SSS) is interpreted as the vector length field 1659B (EVEX byte 3, bit [6-5]-$L_{1-0}$) and the broadcast field 1657B (EVEX byte 3, bit [4]-B).

Exemplary Register Architecture

Figure 18:
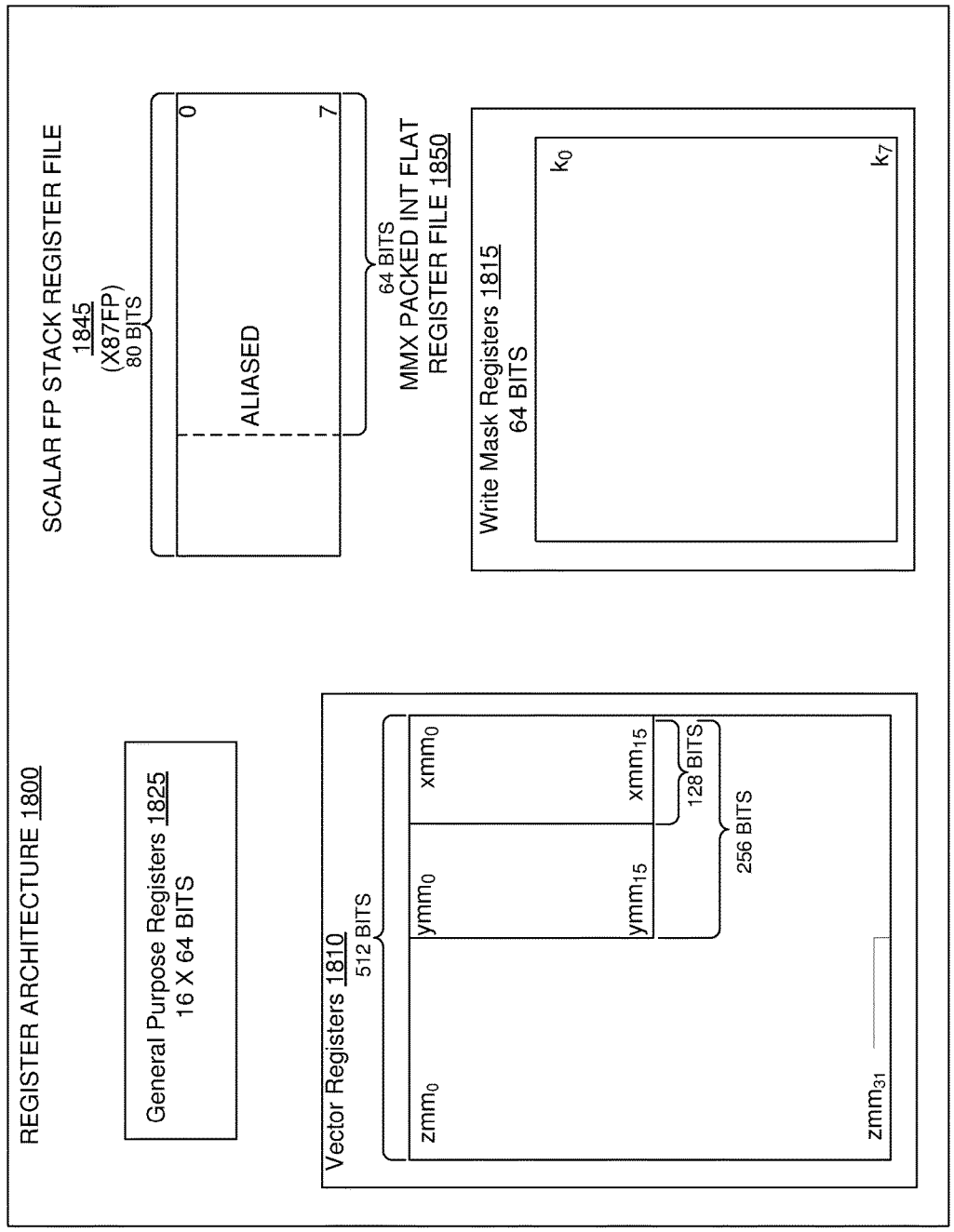
FIG. 18 is a block diagram of a register architecture according to one embodiment of the invention.

FIG. 18 is a block diagram of a register architecture 1800 according to one embodiment of the invention. In the embodiment illustrated, there are 32 vector registers 1810 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1700 operates on these overlaid register file as illustrated in the below tables.

| Adjustable Vector Length | Class | Operations | Registers |
|---|---|---|---|
| Instruction Templates that do not include the vector length field 1659B | A (FIG. 6A; 1U = 0) | 1610, 1615, 1625, 1630 | zmm registers (the vector length is 64 byte) |
| | B (FIG. 16B; U = 1) | 1612 | zmm registers (the vector length is 64 byte) |
| Instruction templates that do include the vector length field 1659B | B (FIG. 16B; U = 1) | 1617, 1627 | zmm, ymm, or xmm registers (the vector length is 64 byte, 32 byte, or 16 byte) depending on the vector length field 1659B |

In other words, the vector length field 1659B selects between a maximum length and one or more other shorter lengths, where each such shorter length is half the length of the preceding length; and instructions templates without the vector length field 1659B operate on the maximum vector length. Further, in one embodiment, the class B instruction templates of the specific vector friendly instruction format 1700 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1815—in the embodiment illustrated, there are 8 write mask registers (k0 through k7), each 64 bits in size. In an alternate embodiment, the write mask registers 1815 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1825—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1845, on which is aliased the MMX packed integer flat register file 1850—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-order and Out-of-order Core Block Diagram

FIG. 19A is a block diagram illustrating both an exemplary in-order pipeline and an exemplary register renaming, out-of-order issue/execution pipeline according to embodiments of the invention. FIG. 19B is a block diagram illustrating both an exemplary embodiment of an in-order architecture core and an exemplary register renaming, out-of-order issue/execution architecture core to be included in a processor according to embodiments of the invention. The solid lined boxes in FIGS. 19A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 19A, a processor pipeline 1900 includes a fetch stage 1902, a length decode stage 1904, a decode stage 1906, an allocation stage 1908, a renaming stage 1910, a scheduling (also known as a dispatch or issue) stage 1912, a register read/memory read stage 1914, an execute stage 1916, a write back/memory write stage 1918, an exception handling stage 1922, and a commit stage 1924.

FIG. 19B shows processor core 1990 including a front end unit 1930 coupled to an execution engine unit 1950, and both are coupled to a memory unit 1970. The core 1990 may be a reduced instruction set computing (RISC) core, a complex instruction set computing (CISC) core, a very long instruction word (VLIW) core, or a hybrid or alternative core type. As yet another option, the core 1990 may be a special-purpose core, such as, for example, a network or communication core, compression engine, coprocessor core, general purpose computing graphics processing unit (GPGPU) core, graphics core, or the like.

The front end unit 1930 includes a branch prediction unit 1932 coupled to an instruction cache unit 1934, which is coupled to an instruction translation lookaside buffer (TLB) 1936, which is coupled to an instruction fetch unit 1938, which is coupled to a decode unit 1940. The decode unit 1940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1990 includes a microcode ROM or other medium that stores microcode for certain macroinstructions (e.g., in decode unit 1940 or otherwise within the front end unit 1930). The decode unit 1940 is coupled to a rename/allocator unit 1952 in the execution engine unit 1950.

The execution engine unit 1950 includes the rename/allocator unit 1952 coupled to a retirement unit 1954 and a set of one or more scheduler unit(s) 1956. The scheduler unit(s) 1956 represents any number of different schedulers, including reservations stations, central instruction window, etc. The scheduler unit(s) 1956 is coupled to the physical register file(s) unit(s) 1958. Each of the physical register file(s) units 1958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1958 comprises a vector registers unit, a write mask registers unit, and a scalar registers unit. These register units may provide architectural vector registers, vector mask registers, and general purpose registers. The physical register file(s) unit(s) 1958 is overlapped by the retirement unit 1954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1954 and the physical register file(s) unit(s) 1958 are coupled to the execution cluster(s) 1960. The execution cluster(s) 1960 includes a set of one or more execution units 1962 and a set of one or more memory access units 1964. The execution units 1962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1956, physical register file(s) unit(s) 1958, and execution cluster(s) 1960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1964). It should also be understood that where separate pipelines are used, one or more of these pipelines may be out-of-order issue/execution and the rest in-order.

The set of memory access units 1964 is coupled to the memory unit 1970, which includes a data TLB unit 1972 coupled to a data cache unit 1974 coupled to a level 2 (L2) cache unit 1976. In one exemplary embodiment, the memory access units 1964 may include a load unit, a store address unit, and a store data unit, each of which is coupled to the data TLB unit 1972 in the memory unit 1970. The instruction cache unit 1934 is further coupled to a level 2 (L2) cache unit 1976 in the memory unit 1970. The L2 cache unit 1976 is coupled to one or more other levels of cache and eventually to a main memory.

By way of example, the exemplary register renaming, out-of-order issue/execution core architecture may implement the pipeline 1900 as follows: 1) the instruction fetch 1938 performs the fetch and length decoding stages 1902 and 1904; 2) the decode unit 1940 performs the decode stage 1906; 3) the rename/allocator unit 1952 performs the allocation stage 1908 and renaming stage 1910; 4) the scheduler unit(s) 1956 performs the schedule stage 1912; 5) the physical register file(s) unit(s) 1958 and the memory unit 1970 perform the register read/memory read stage 1914; the execution cluster 1960 perform the execute stage 1916; 6) the memory unit 1970 and the physical register file(s) unit(s) 1958 perform the write back/memory write stage 1918; 7) various units may be involved in the exception handling stage 1922; and 8) the retirement unit 1954 and the physical register file(s) unit(s) 1958 perform the commit stage 1924.

The core 1990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1934/1974 and a shared L2 cache unit 1976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-order Core Architecture

Figure 20B:
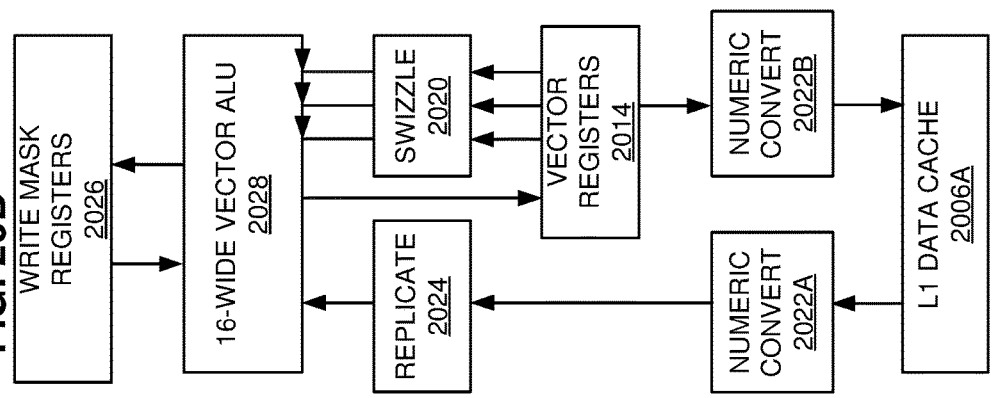
FIGS. 20A-20B illustrate a block diagram of a more specific exemplary in-order core architecture, which core would be one of several logic blocks (including other cores of the same type and/or different types) in a chip.
Figure 20A:
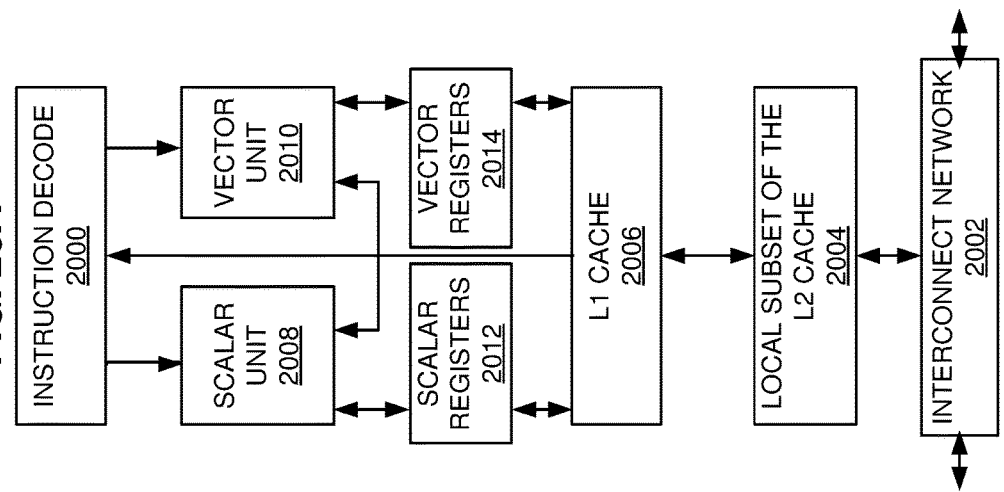

FIGS. 20A-20B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 20A is a block diagram of a single processor core, along with its connection to the on-die interconnect network 2002 and with its local subset of the Level 2 (L2) cache 2004, according to embodiments of the invention. In one embodiment, an instruction decoder 2000 supports the x86 instruction set with a packed data instruction set extension. An L1 cache 2006 allows low-latency accesses to cache memory into the scalar and vector units. While in one embodiment (to simplify the design), a scalar unit 2008 and a vector unit 2010 use separate register sets (respectively, scalar registers 2012 and vector registers 2014) and data transferred between them is written to memory and then read back in from a level 1 (L1) cache 2006, alternative embodiments of the invention may use a different approach (e.g., use a single register set or include a communication path that allow data to be transferred between the two register files without being written and read back).

The local subset of the L2 cache 2004 is part of a global L2 cache that is divided into separate local subsets, one per processor core. Each processor core has a direct access path to its own local subset of the L2 cache 2004. Data read by a processor core is stored in its L2 cache subset 2004 and can be accessed quickly, in parallel with other processor cores accessing their own local L2 cache subsets. Data written by a processor core is stored in its own L2 cache subset 2004 and is flushed from other subsets, if necessary. The ring network ensures cohereincy for shared data. The ring network is bi-directional to allow agents such as processor cores, L2 caches and other logic blocks to communicate with each other within the chip. Each ring data-path is 1012-bits wide per direction.

FIG. 20B is an expanded view of part of the processor core in FIG. 20A according to embodiments of the invention. FIG. 20B includes an L1 data cache 2006A part of the L1 cache 2004, as well as more detail regarding the vector unit 2010 and the vector registers 2014. Specifically, the vector unit 2010 is a 16-wide vector processing unit (VPU) (see the 16-wide ALU 2028), which executes one or more of integer, single-precision float, and double-precision float instructions. The VPU supports swizzling the register inputs with swizzle unit 2020, numeric conversion with numeric convert units 2022A-B, and replication with replication unit 2024 on the memory input. Write mask registers 2026 allow predicating resulting vector writes.

Figure 21:
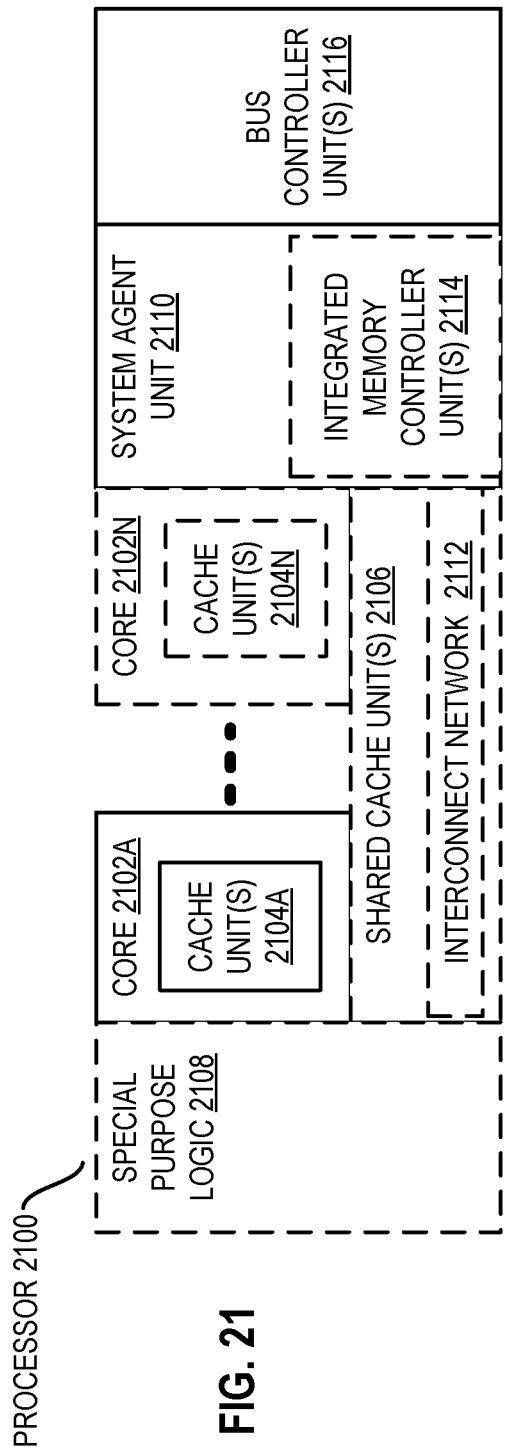
FIG. 21 is a block diagram of a processor 2100 that may have more than one core, may have an integrated memory controller, and may have integrated graphics according to embodiments of the invention.

FIG. 21 is a block diagram of a processor 2100 that may have more than one core, may have an integrated memory controller, and may have integrated graphics according to embodiments of the invention. The solid lined boxes in FIG. 21 illustrate a processor 2100 with a single core 2102A, a system agent 2110, a set of one or more bus controller units 2116, while the optional addition of the dashed lined boxes illustrates an alternative processor 2100 with multiple cores 2102A-N, a set of one or more integrated memory controller unit(s) 2114 in the system agent unit 2110, and special purpose logic 2108.

Thus, different implementations of the processor 2100 may include: 1) a CPU with the special purpose logic 2108 being integrated graphics and/or scientific (throughput) logic (which may include one or more cores), and the cores 2102A-N being one or more general purpose cores (e.g., general purpose in-order cores, general purpose out-of-order cores, a combination of the two); 2) a coprocessor with the cores 2102A-N being a large number of special purpose cores intended primarily for graphics and/or scientific (throughput); and 3) a coprocessor with the cores 2102A-N being a large number of general purpose in-order cores. Thus, the processor 2100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 2100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 2106, and external memory (not shown) coupled to the set of integrated memory controller units 2114. The set of shared cache units 2106 may include one or more mid-level caches, such as level 2 (L2), level 3 (L3), level 4 (L4), or other levels of cache, a last level cache (LLC), and/or combinations thereof. While in one embodiment a ring based interconnect unit 2112 interconnects the integrated graphics logic 2108 (integrated graphics logic 2108 is an example of and is also referred to herein as special purpose logic), the set of shared cache units 2106, and the system agent unit 2110/integrated memory controller unit(s) 2114, alternative embodiments may use any number of well-known techniques for interconnecting such units. In one embodiment, cohereincy is maintained between one or more cache units 2106 and cores 2102-A-N.

In some embodiments, one or more of the cores 2102A-N are capable of multi-threading. The system agent 2110 includes those components coordinating and operating cores 2102A-N. The system agent unit 2110 may include for example a power control unit (PCU) and a display unit. The PCU may be or include logic and components needed for regulating the power state of the cores 2102A-N and the integrated graphics logic 2108. The display unit is for driving one or more externally connected displays.

The cores 2102A-N may be homogenous or heterogeneous in terms of architecture instruction set; that is, two or more of the cores 2102A-N may be capable of execution the same instruction set, while others may be capable of executing only a subset of that instruction set or a different instruction set.

Exemplary Computer Architectures

FIGS. 22-25 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 22:
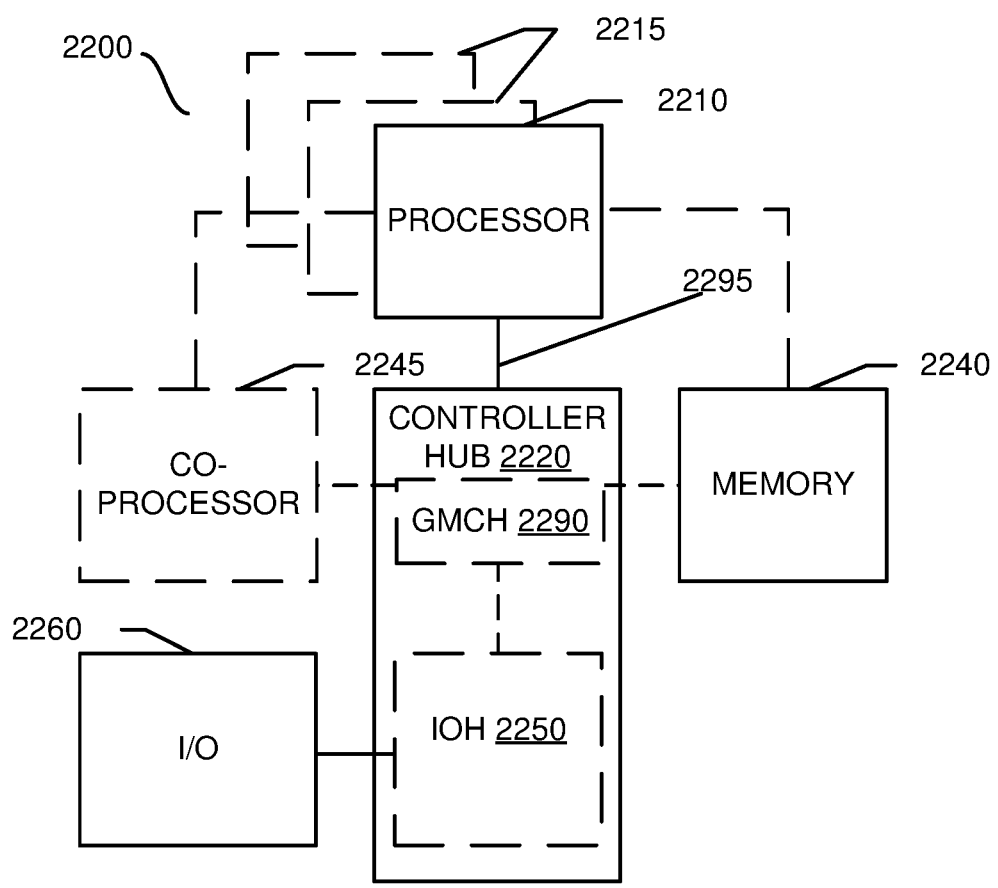
FIGS. 22-25 are block diagrams of exemplary computer architectures.

Referring now to FIG. 22, shown is a block diagram of a system 2200 in accordance with one embodiment of the present invention. The system 2200 may include one or more processors 2210, 2215, which are coupled to a controller hub 2220. In one embodiment the controller hub 2220 includes a graphics memory controller hub (GMCH) 2290 and an Input/Output Hub (IOH) 2250 (which may be on separate chips); the GMCH 2290 includes memory and graphics controllers to which are coupled memory 2240 and a coprocessor 2245; the IOH 2250 couples input/output (I/O) devices 2260 to the GMCH 2290. Alternatively, one or both of the memory and graphics controllers are integrated within the processor (as described herein), the memory 2240 and the coprocessor 2245 are coupled directly to the processor 2210, and the controller hub 2220 in a single chip with the IOH 2250.

The optional nature of additional processors 2215 is denoted in FIG. 22 with broken lines. Each processor 2210, 2215 may include one or more of the processing cores described herein and may be some version of the processor 2100.

The memory 2240 may be, for example, dynamic random access memory (DRAM), phase change memory (PCM), or a combination of the two. For at least one embodiment, the controller hub 2220 communicates with the processor(s) 2210, 2215 via a multi-drop bus, such as a frontside bus (FSB), point-to-point interface such as QuickPath Interconnect (QPI), or similar connection 2295.

In one embodiment, the coprocessor 2245 is a special-purpose processor, such as, for example, a high-throughput MIC processor, a network or communication processor, compression engine, graphics processor, GPGPU, embedded processor, or the like. In one embodiment, controller hub 2220 may include an integrated graphics accelerator.

There can be a variety of differences between the physical resources 2210, 2215 in terms of a spectrum of metrics of merit including architectural, microarchitectural, thermal, power consumption characteristics, and the like.

In one embodiment, the processor 2210 executes instructions that control data processing operations of a general type. Embedded within the instructions may be coprocessor instructions. The processor 2210 recognizes these coprocessor instructions as being of a type that should be executed by the attached coprocessor 2245. Accordingly, the processor 2210 issues these coprocessor instructions (or control signals representing coprocessor instructions) on a coprocessor bus or other interconnect, to coprocessor 2245. Coprocessor(s) 2245 accept and execute the received coprocessor instructions.

Figure 23:
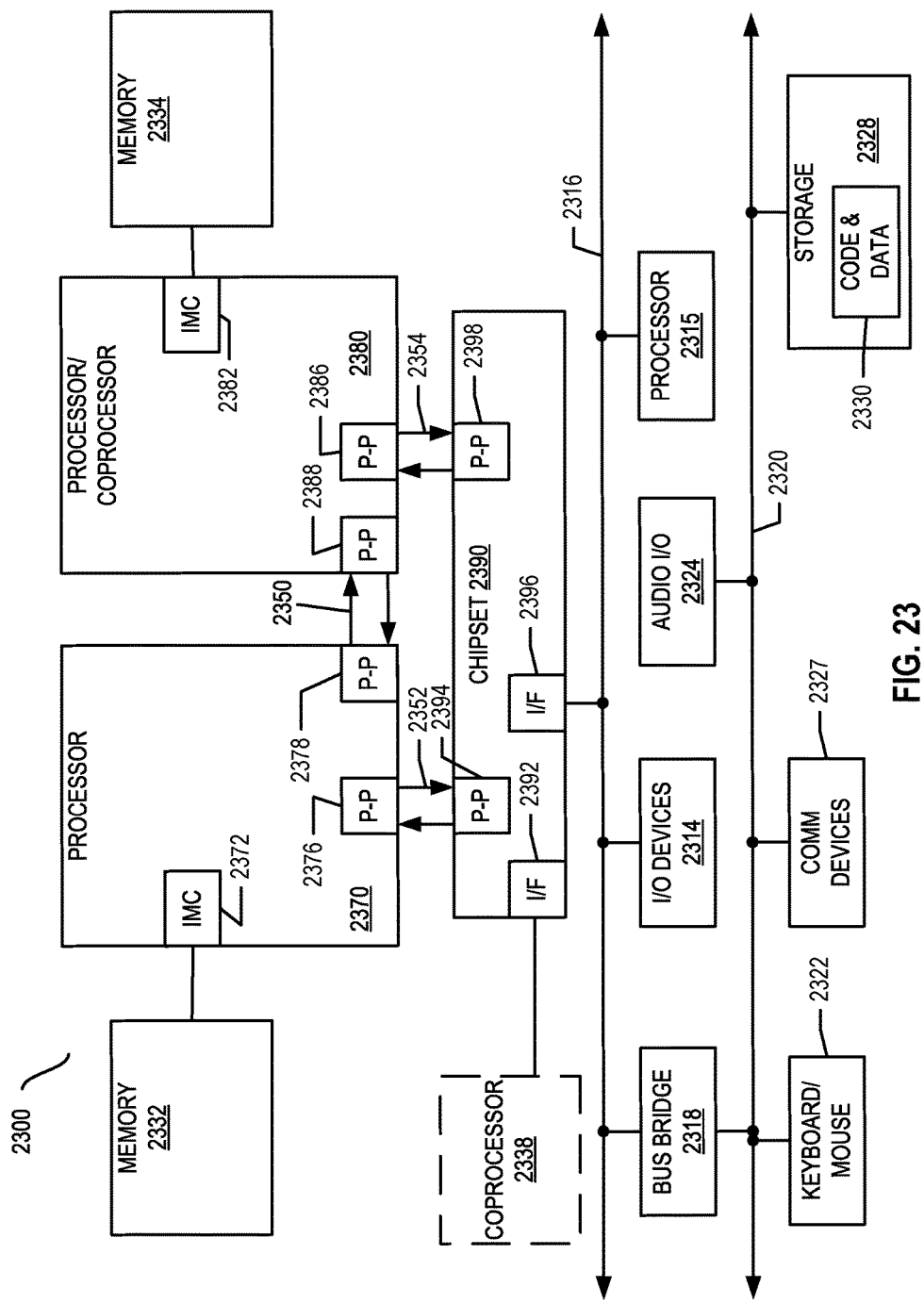

Referring now to FIG. 23, shown is a block diagram of a first more specific exemplary system 2300 in accordance with an embodiment of the present invention. As shown in FIG. 23, multiprocessor system 2300 is a point-to-point interconnect system, and includes a first processor 2370 and a second processor 2380 coupled via a point-to-point interconnect 2350. Each of processors 2370 and 2380 may be some version of the processor 2100. In one embodiment of the invention, processors 2370 and 2380 are respectively processors 2210 and 2215, while coprocessor 2338 is coprocessor 2245. In another embodiment, processors 2370 and 2380 are respectively processor 2210 coprocessor 2245.

Processors 2370 and 2380 are shown including integrated memory controller (IMC) units 2372 and 2382, respectively. Processor 2370 also includes as part of its bus controller units point-to-point (P-P) interfaces 2376 and 2378; similarly, second processor 2380 includes P-P interfaces 2386 and 2388. Processors 2370, 2380 may exchange information via a point-to-point (P-P) interface 2350 using P-P interface circuits 2378, 2388. As shown in FIG. 23, IMCs 2372 and 2382 couple the processors to respective memories, namely a memory 2332 and a memory 2334, which may be portions of main memory locally attached to the respective processors.

Processors 2370, 2380 may each exchange information with a chipset 2390 via individual P-P interfaces 2352, 2354 using point to point interface circuits 2376, 2394, 2386, 2398. Chipset 2390 may optionally exchange information with the coprocessor 2338 via a high-performance interface 2392. In one embodiment, the coprocessor 2338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2390 may be coupled to a first bus 2316 via an interface 2396. In one embodiment, first bus 2316 may be a Peripheral Component Interconnect (PCI) bus, or a bus such as a PCI Express bus or another third generation I/O interconnect bus, although the scope of the present invention is not so limited.

As shown in FIG. 23, various I/O devices 2314 may be coupled to first bus 2316, along with a bus bridge 2318 which couples first bus 2316 to a second bus 2320. In one embodiment, one or more additional processor(s) 2315, such as coprocessors, high-throughput MIC processors, GPGPU's, accelerators (such as, e.g., graphics accelerators or digital signal processing (DSP) units), field programmable gate arrays, or any other processor, are coupled to first bus 2316. In one embodiment, second bus 2320 may be a low pin count (LPC) bus. Various devices may be coupled to a second bus 2320 including, for example, a keyboard and/or mouse 2322, communication devices 2327 and a storage unit 2328 such as a disk drive or other mass storage device which may include instructions/code and data 2330, in one embodiment. Further, an audio I/O 2324 may be coupled to the second bus 2320. Note that other architectures are possible. For example, instead of the point-to-point architecture of FIG. 23, a system may implement a multi-drop bus or other such architecture.

Figure 24:
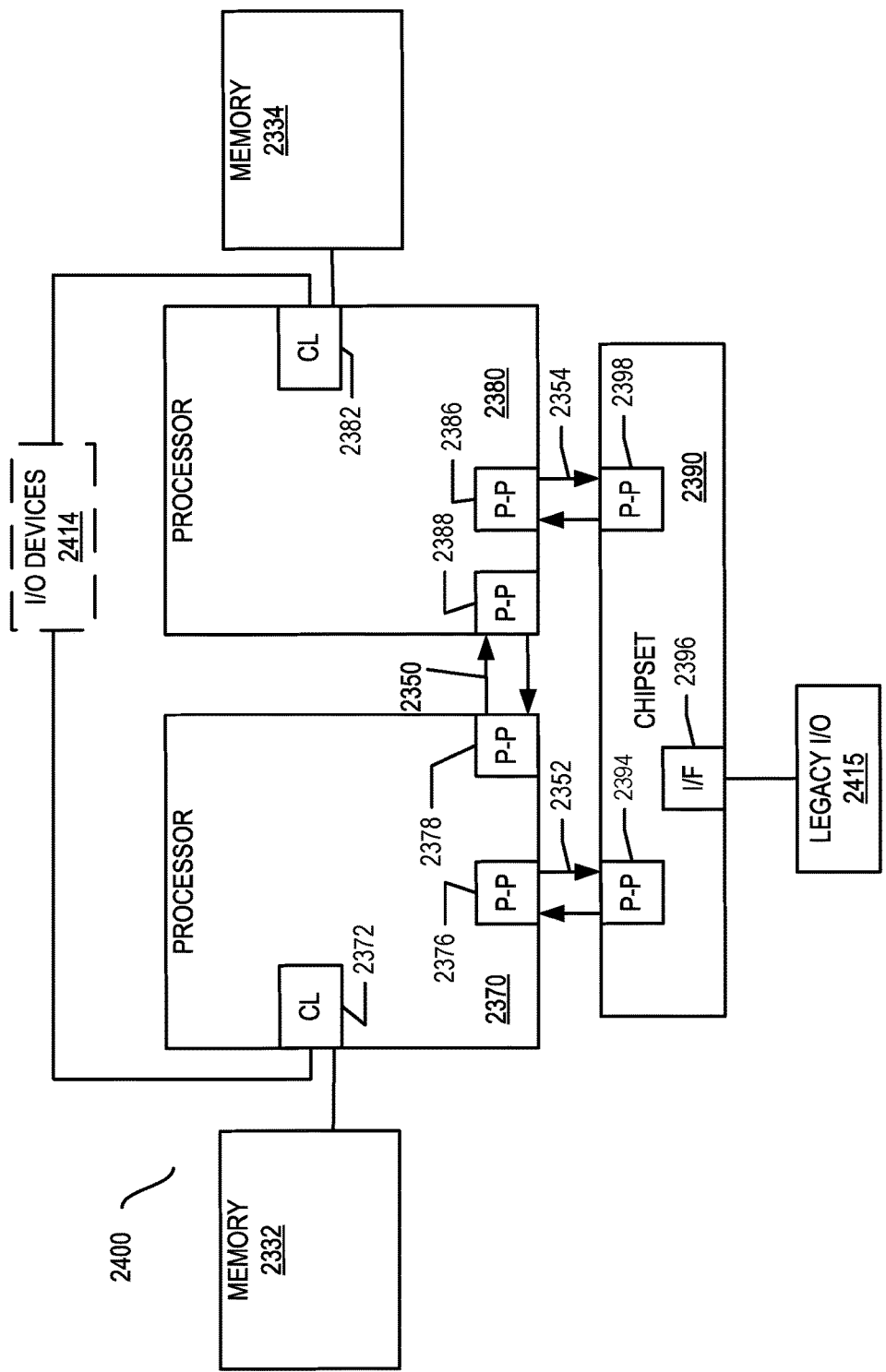

Referring now to FIG. 24, shown is a block diagram of a second more specific exemplary system 2400 in accordance with an embodiment of the present invention. Like elements in FIGS. 23 and 24 bear like reference numerals, and certain aspects of FIG. 23 have been omitted from FIG. 24 in order to avoid obscuring other aspects of FIG. 24.

FIG. 24 illustrates that the processors 2370, 2380 may include integrated memory and I/O control logic ("CL") 2372 and 2382, respectively. Thus, the CL 2372, 2382 include integrated memory controller units and include I/O control logic. FIG. 24 illustrates that not only are the memories 2332, 2334 coupled to the CL 2372, 2382, but also that I/O devices 2414 are also coupled to the control logic 2372, 2382. Legacy I/O devices 2415 are coupled to the chipset 2390.

Figure 25:
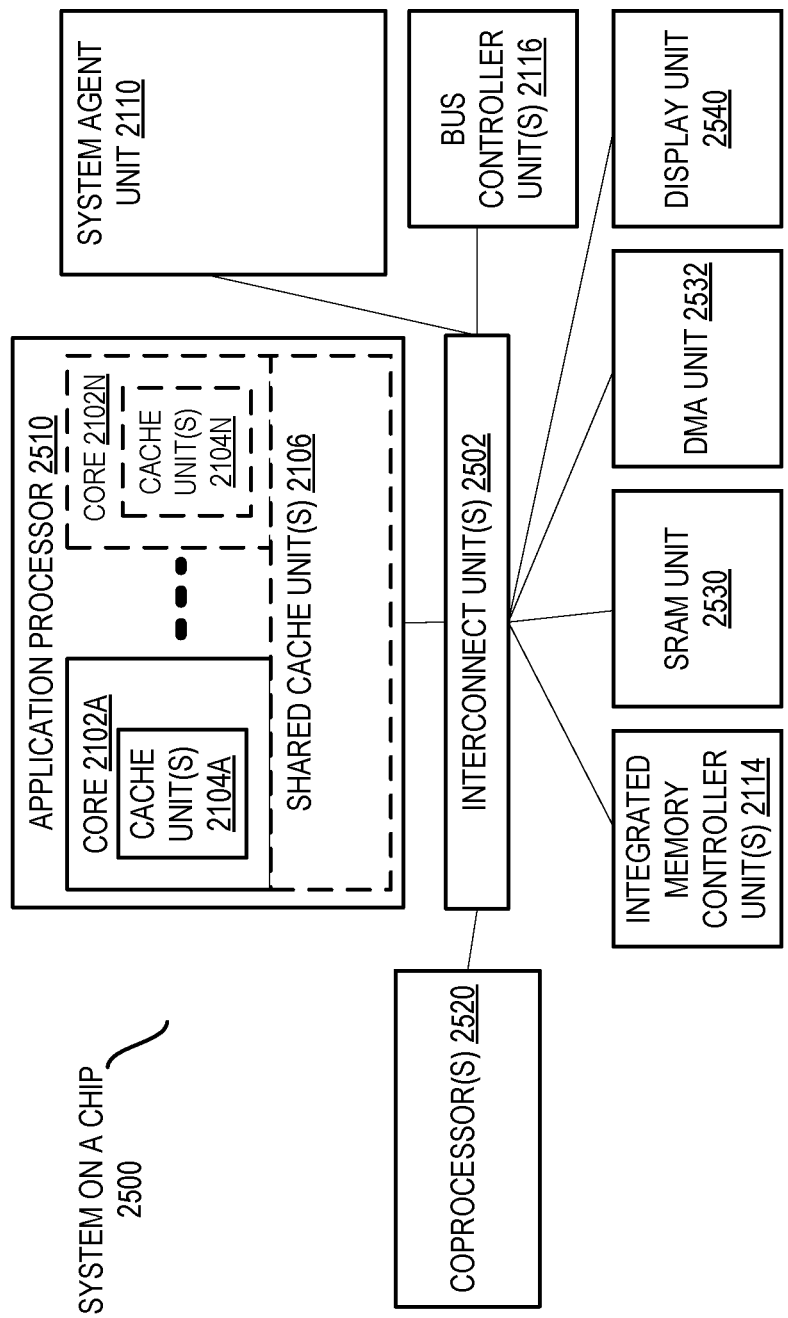

Referring now to FIG. 25, shown is a block diagram of a SoC 2500 in accordance with an embodiment of the present invention. Similar elements in FIG. 21 bear like reference numerals. Also, dashed lined boxes are optional features on more advanced SoCs. In FIG. 25, an interconnect unit(s) 2502 is coupled to: an application processor 2510 which includes a set of one or more cores 2102A-N, which include cache units 2104A-N, and shared cache unit(s) 2106; a system agent unit 2110; a bus controller unit(s) 2116; an integrated memory controller unit(s) 2114; a set or one or more coprocessors 2520 which may include integrated graphics logic, an image processor, an audio processor, and a video processor; an static random access memory (SRAM) unit 2530; a direct memory access (DMA) unit 2532; and a display unit 2540 for coupling to one or more external displays. In one embodiment, the coprocessor(s) 2520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 2330 illustrated in FIG. 23, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 26 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 26 shows a program in a high level language 2602 may be compiled using an x86 compiler 2604 to generate x86 binary code 2606 that may be natively executed by a processor with at least one x86 instruction set core 2616. The processor with at least one x86 instruction set core 2616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2604 represents a compiler that is operable to generate x86 binary code 2606 (e.g., object code) that can, with or without additional linkage processing, be executed on the processor with at least one x86 instruction set core 2616. Similarly, FIG. 26 shows the program in the high level language 2602 may be compiled using an alternative instruction set compiler 2608 to generate alternative instruction set binary code 2610 that may be natively executed by a processor without at least one x86 instruction set core 2614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2612 is used to convert the x86 binary code 2606 into code that may be natively executed by the processor without an x86 instruction set core 2614. This converted code is not likely to be the same as the alternative instruction set binary code 2610 because an instruction converter capable of this is difficult to make; however, the converted code will accomplish the general operation and be made up of instructions from the alternative instruction set. Thus, the instruction converter 2612 represents software, firmware, hardware, or a combination thereof that, through emulation, simulation or any other process, allows a processor or other electronic device that does not have an x86 instruction set processor or core to execute the x86 binary code 2606.

Further Examples

Example 1 provides a processor including: a loop accelerator including a strand profile buffer and a plurality of strand execution circuits, and a binary translator to receive a plurality of loop instructions from an instruction storage, to divide the plurality of loop instructions into a plurality of strands, and to store a strand profile for each of the plurality of strands into the strand profile buffer, each strand profile indicating at least a number of iterations, wherein the binary translator further causes the loop accelerator to execute the plurality of strands asynchronously and in parallel using the plurality of strand execution circuits, each of the strand execution circuits to repeat the strand for the number of iterations indicated in the strand profile associated with the strand.

Example 2 includes the substance of the processor of Example 1, wherein the loop accelerator further enables the plurality of strand execution circuits to satisfy data dependencies by exchanging data via a register file.

Example 3 includes the substance of the processor of any one of Examples 1 to 2, the strand profile for each of the plurality of strands further including at least an instruction pointer to associate an address of an instruction in the loop instructions with the strand, an iteration number to indicate a present loop iteration number of the strand, one or more register base addresses used to access registers within the register file, and a loop exit counter to indicate a loop exit point.

Example 4 includes the substance of the processor of any one of Examples 1 to 3, wherein the binary translator further applies at least one job creation rule to divide the plurality of loop instructions into a plurality of jobs, applies at least one strand creation rule to assign the plurality of jobs to the plurality of strands, and causes the loop accelerator to execute the plurality of strands using the plurality of strand execution circuits.

Example 5 includes the substance of the processor of any one of Examples 1 to 4, wherein instructions within one strand among the plurality of strands are to be executed in program order, and instructions in different strands among the plurality of strands are to be executed out of program order.

Example 6 includes the substance of the processor of Example 5, wherein instructions included in the different strands among the plurality of strands are to retire in program order.

Example 7 includes the substance of the processor of any one of Examples 1 to 6, wherein at least one of the binary translator and the loop accelerator further verify whether a hardware counter can be used to support execution of the plurality of strands.

Example 8 provides a method including: receiving, by a binary translator, a plurality of loop instructions from an instruction storage, dividing the plurality of loop instructions into a plurality of strands, and storing a strand documentation for each of the plurality of strands into a strand documentation buffer, each strand documentation indicating at least a number of iterations, and causing a loop accelerator to execute the plurality of strands asynchronously and in parallel using a plurality of strand execution circuits, wherein each of the strand execution circuits repeats a strand for the number of iterations indicated in the strand documentation associated with the strand.

Example 9 includes the substance of the method of Example 8, further including enabling the plurality of strand execution circuits to satisfy data dependencies by exchanging data via a register file.

Example 10 includes the substance of the method of any one of Examples 8 to 9, the strand documentation for each of the plurality of strands further including at least an instruction pointer to associate an address of an instruction in the loop instructions with the strand, an iteration number to indicate a present loop iteration number of the strand, one or more register base addresses used to access registers within the register file, and a loop exit counter to indicate a loop exit point.

Example 11 includes the substance of the method of any one of Examples 8 to 10, further including the binary translator using at least one job creation rule to divide the plurality of loop instructions into a plurality of jobs, using at least one strand creation rule to assign the plurality of jobs to the plurality of strands, and causing the loop accelerator to execute the plurality of strands using the plurality of strand execution circuits.

Example 12 includes the substance of the method of any one of Examples 8 to 11, wherein instructions within one strand among the plurality of strands are to be executed in program order, and instructions in different strands among the plurality of strands are to be executed out of program order.

Example 13 includes the substance of the method of Example 12, wherein instructions included in the different strands are to retire in program order.

Example 14 includes the substance of the method of Example 13, the method further including at least one of the binary translator and the loop accelerator verifying whether a hardware counter can be used to support execution of the strands.

Example 15 provides an apparatus including: an instruction storage, a binary translator to receive a plurality of loop instructions from the instruction storage, to divide the plurality of loop instructions into a plurality of strands, to construct a hardware-supported version and a non-hardware-supported version of at least one strand of the plurality of strands, dynamically determine whether to dynamically calculate an iteration number of the at least one strand, and dynamically determine whether to pass a calculated value can to a hardware counter, and when both determinations are affirmative, cause a loop accelerator to execute the hardware-supported version of the at least one strand, otherwise, cause the loop accelerator to execute the non-hardware-supported version of the at least one strand.

Example 16 includes the substance of the apparatus of Example 15, further including a processing core including at least a decode circuit and an execution circuit, wherein the processing core decodes and executes at least one instruction not executed by the loop accelerator.

Example 17 includes the substance of the apparatus of any one of Examples 15 to 16, wherein at least one of the both determinations is made utilizing circuitry contained in at least one of the binary translator, the loop accelerator, and the processing core.

Example 18 includes the substance of the apparatus of any one of Examples 15 to 17, wherein the binary translator further creates a strand documentation for each of the plurality of strands, and stores the strand documentation into a strand documentation buffer.

Example 19 includes the substance of the apparatus of Example 18, wherein the strand documentation for each of the plurality of strands to include at least an instruction pointer to associate an address of an instruction in the loop instructions with the strand, an iteration number to indicate a present loop iteration number of the strand, one or more register base addresses to access registers within a register file, and a loop exit counter to indicate a loop exit point.

Example 20 includes the substance of the apparatus of any one of Examples 18 to 19, wherein the strand documentation for each of the plurality of strands further includes a program order and a step size.

Example 21 provides a system including: a loop accelerator including a strand profile buffer and a plurality of strand execution circuits, and a binary translator to receive a plurality of loop instructions from an instruction storage, to divide the plurality of loop instructions into a plurality of strands, and to store a strand profile for each of the plurality of strands into the strand profile buffer, each strand profile indicating at least a number of iterations, wherein the binary translator further causes the loop accelerator to execute the plurality of strands asynchronously and in parallel using the plurality of strand execution circuits, wherein each of the strand execution circuits repeats the strand for the number of iterations indicated in the strand profile associated with the strand.

Example 22 includes the substance of the system of Example 21, wherein the loop accelerator further enables the plurality of strand execution circuits to satisfy data dependencies by exchanging data via a register file.

Example 23 includes the substance of the system of any one of Examples 21 to 22, the strand profile for each of the plurality of strands further including at least an instruction pointer to associate an address of an instruction in the loop instructions with the strand, an iteration number to indicate a present loop iteration number of the strand, one or more register base addresses used to access registers within the register file, and a loop exit counter to indicate a loop exit point.

Example 24 includes the substance of the system of any one of Examples 21 to 23, wherein the binary translator further applies at least one job creation rule to divide the plurality of loop instructions into a plurality of jobs, applies at least one strand creation rule to assign the plurality of jobs to the plurality of strands, and causes the loop accelerator to execute the plurality of strands using the plurality of strand execution circuits.

Example 25 includes the substance of the system of any one of Examples 21 to 24, wherein instructions within one strand among the plurality of strands are to be executed in program order, and instructions in different strands among the plurality of strands are to be executed out of program order.

Example 26 includes the substance of the system of Example 25, wherein instructions included in the different strands among the plurality of strands are to retire in program order.

Example 27 includes the substance of the system of any one of Examples 21 to 26, wherein at least one of the binary translator and the loop accelerator further verify whether a hardware counter can be used to support execution of the plurality of strands.

Example 28 provides a non-transitory computer readable medium containing instructions that when executed by a processing core, cause the processing core to perform a method including: receiving, by a binary translator, a plurality of loop instructions from an instruction storage, dividing the plurality of loop instructions into a plurality of strands, and storing a strand documentation for each of the plurality of strands into a strand documentation buffer, each strand documentation indicating at least a number of iterations, and causing a loop accelerator to execute the plurality of strands asynchronously and in parallel using a plurality of strand execution circuits, wherein each of the strand execution circuits repeats a strand for the number of iterations indicated in the strand documentation associated with the strand.

Example 29 includes the substance of the non-transitory computer readable medium of Example 28, further including enabling the plurality of strand execution circuits to satisfy data dependencies by exchanging data via a register file.

Example 30 includes the substance of the non-transitory computer readable medium of any one of Examples 28 to 29, the strand documentation for each of the plurality of strands further including at least an instruction pointer to associate an address of an instruction in the loop instructions with the strand, an iteration number to indicate a present loop iteration number of the strand, one or more register base addresses used to access registers within the register file, and a loop exit counter to indicate a loop exit point.

Example 31 includes the substance of the non-transitory computer readable medium of any one of Examples 28 to 30, further including the binary translator using at least one job creation rule to divide the plurality of loop instructions into a plurality of jobs, using at least one strand creation rule to assign the plurality of jobs to the plurality of strands, and causing the loop accelerator to execute the plurality of strands using the plurality of strand execution circuits.

Example 32 includes the substance of the non-transitory computer readable medium of any one of Examples 28 to 31, wherein instructions within one strand among the plurality of strands are to be executed in program order, and instructions in different strands among the plurality of strands are to be executed out of program order.

Example 33 includes the substance of the non-transitory computer readable medium of Example 32, wherein instructions included in the different strands are to retire in program order.

Example 34 includes the substance of the non-transitory computer readable medium of Example 33, the method further including at least one of the binary translator and the loop accelerator verifying whether a hardware counter can be used to support execution of the strands.

Example 35 provides an apparatus including: means for receiving a plurality of loop instructions from an instruction storage, means for dividing the plurality of loop instructions into a plurality of strands, means for executing the plurality of strands, means for creating and storing a strand profile for each of the plurality of strands into a strand profile buffer, each strand profile indicating at least a number of iterations, wherein the means for executing executes each of the plurality of strands asynchronously, in parallel, and repeatedly for the number of iterations indicated in each entry of the strand profile buffer associated with the strand.

Example 36 includes the substance of the apparatus of Example 35, further including means for exchanging data among the plurality of strands.

Example 37 provides a method including: receiving, by a binary translator, a plurality of loop instructions from an instruction storage, dividing the plurality of loop instructions into a plurality of strands, constructing a hardware-supported version and a non-hardware-supported version of at least one strand of the plurality of strands, determining whether an iteration number of the at least one strand can be calculated dynamically, and determining whether a calculated value can be correctly passed to a hardware counter, and when both determinations are affirmative, causing a loop accelerator to execute the hardware-supported version of the at least one strand, otherwise, causing the loop accelerator to execute the non-hardware-supported version of the at least one strand.

Example 38 includes the substance of the method of Example 37, wherein the binary translator further applies at least one strand creation rule to divide the plurality of loop instructions into the plurality of strands, and causes the loop accelerator to execute the plurality of strands using a plurality of strand execution circuits.

Example 39 includes the substance of the method of any one of Examples 37 to 38, wherein the binary translator further creates a strand documentation for each of the plurality of strands, and stores the strand documentation into a strand documentation buffer.

Example 40 includes the substance of the method of Example 39, wherein the strand documentation for each of the plurality of strands to include at least an instruction pointer to associate an address of an instruction in the loop instructions with the strand, an iteration number to indicate a present loop iteration number of the strand, one or more register base addresses to access registers within a register file, and a loop exit counter to indicate a loop exit point.

Example 41 includes the substance of the method of any one of Examples 39 to 40, wherein the strand documentation for each of the plurality of strands further includes a program order.

Example 42 includes the substance of the method of any one of Examples 39 to 41, wherein the strand documentation for each of the plurality of strands further includes a step size.

Embodiments of the mechanisms disclosed herein may be implemented in hardware, software, firmware, or a combination of such implementation approaches. Embodiments of embodiments disclosed herein may be implemented as computer programs or program code executing on programmable systems comprising at least one processor, a storage system (including volatile and non-volatile memory and/or storage elements), at least one input device, and at least one output device.

Although some embodiments disclosed herein involve data handling and distribution in the context of hardware execution circuits, other embodiments can be accomplished by way of a data or instructions stored on a non-transitory machine-readable, tangible medium, which, when performed by a machine, cause the machine to perform functions consistent with at least one embodiment. In one embodiment, functions associated with embodiments of the present disclosure are embodied in machine-executable instructions. The instructions can be used to cause a general-purpose or special-purpose processor that is programmed with the instructions to perform the steps of the at least one embodiment. Embodiments disclosed herein are provided as a computer program product or software which includes a machine or computer-readable medium having stored thereon instructions which are used to program a computer (or other electronic devices) to perform one or more operations according to the at least one embodiment. Alternatively, steps of some embodiments are performed by specific hardware components that contain fixed-function logic for performing the steps, or by any combination of programmed computer components and fixed-function hardware components.

Instructions used to program logic to perform the at least one embodiment can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

What is claimed is:

1. A processor comprising:
   a loop accelerator comprising a strand profile buffer and a plurality of strand execution circuits;
   an instruction storage disposed separate from a binary translator; and
   the binary translator to:
      receive a plurality of loop instructions from the instruction storage;
      divide the plurality of loop instructions into a plurality of strands;
      construct a hardware-supported version and a non-hardware-supported version of at least one strand of the plurality of strands;
      dynamically determine whether to dynamically calculate an iteration number of the at least one strand, and dynamically determine whether to pass a calculated value to a hardware counter used to detect the iteration on which counted exit should be taken; and
      when both determinations are affirmative, cause a loop accelerator to execute the hardware-supported version of the at least one strand, otherwise, cause the loop accelerator to execute the non-hardware-supported version of the at least one strand.

2. The processor of claim 1, wherein the loop accelerator further enables the plurality of strand execution circuits to satisfy data dependencies by exchanging data via a register file.

3. The processor of claim 2, the strand profile for each of the plurality of strands further comprising at least an instruction pointer to associate an address of an instruction in the loop instructions with the strand, an iteration number to indicate a present loop iteration number of the strand, one or more register base addresses used to access registers within the register file, and a loop exit counter to indicate a loop exit point.

4. The processor of claim 1, wherein the binary translator further applies at least one job creation rule to divide the plurality of loop instructions into a plurality of jobs, applies at least one strand creation rule to assign the plurality of jobs to the plurality of strands, and causes the loop accelerator to execute the plurality of strands using the plurality of strand execution circuits.

5. The processor of claim 1, wherein instructions within one strand among the plurality of strands are to be executed in program order, and instructions in different strands among the plurality of strands are to be executed out of program order.

6. The processor of claim 5, wherein instructions included in the different strands among the plurality of strands are to retire in program order.

7. The processor of claim 6, wherein at least one of the binary translator and the loop accelerator further verify whether to use a hardware counter to support execution of the plurality of strands.

8. A method to be executed by an apparatus comprising an instruction storage disposed separate from a binary translator, the binary translator to:
receive a plurality of loop instructions from the instruction storage;
divide the plurality of loop instructions into a plurality of strands;
construct a hardware-supported version and a non-hardware-supported version of at least one strand of the plurality of strands;
dynamically determine whether to dynamically calculate an iteration number of the at least one strand, and dynamically determine whether to pass a calculated value to a hardware counter used to detect the iteration on which counted exit should be taken; and
when both determinations are affirmative, cause a loop accelerator to execute the hardware-supported version of the at least one strand, otherwise, cause the loop accelerator to execute the non-hardware-supported version of the at least one strand.

9. The method of claim 8, further comprising enabling the plurality of strand execution circuits to satisfy data dependencies by exchanging data via a register file.

10. The method of claim 9, wherein the binary translator further creates a strand documentation for each of the plurality of strands, and stores the strand documentation into a strand documentation buffer, the strand documentation for each of the plurality of strands further comprising at least an instruction pointer to associate an address of an instruction in the loop instructions with the strand, an iteration number to indicate a present loop iteration number of the strand, one or more register base addresses used to access registers within the register file, and a loop exit counter to indicate a loop exit point.

11. The method of claim 8, further comprising the binary translator using at least one job creation rule to divide the plurality of loop instructions into a plurality of jobs, using at least one strand creation rule to assign the plurality of jobs to the plurality of strands, and causing the loop accelerator to execute the plurality of strands using the plurality of strand execution circuits.

12. The method of claim 8, wherein instructions within one strand among the plurality of strands are to be executed in program order, and instructions in different strands among the plurality of strands are to be executed out of program order.

13. The method of claim 12, wherein instructions included in the different strands are to retire in program order.

14. The method of claim 13, the method further comprising at least one of the binary translator and the loop accelerator verifying whether to use a hardware counter to support execution of the strands.

15. An apparatus comprising:
an instruction storage disposed separate from a binary translator, the binary translator to:
receive a plurality of loop instructions from the instruction storage;
divide the plurality of loop instructions into a plurality of strands;
construct a hardware-supported version and a non-hardware-supported version of at least one strand of the plurality of strands;
dynamically determine whether to dynamically calculate an iteration number of the at least one strand, and dynamically determine whether to pass a calculated value to a hardware counter used to detect the iteration on which counted exit should be taken; and
when both determinations are affirmative, cause a loop accelerator to execute the hardware-supported version of the at least one strand, otherwise, cause the loop accelerator to execute the non-hardware-supported version of the at least one strand.

16. The apparatus of claim 15, further comprising a processing core comprising at least a decode circuit and an execution circuit, wherein the processing core decodes and executes at least one instruction not executed by the loop accelerator.

17. The apparatus of claim 16, wherein at least one of the both determinations is made utilizing circuitry contained in at least one of the binary translator, the loop accelerator, and the processing core.

18. The apparatus of claim 15, wherein the binary translator further creates a strand documentation for each of the plurality of strands, and stores the strand documentation into a strand documentation buffer.

19. The apparatus of claim 18, wherein the strand documentation for each of the plurality of strands comprises at least an instruction pointer to associate an address of an instruction in the loop instructions with the strand, an iteration number to indicate a present loop iteration number of the strand, one or more register base addresses to access registers within a register file, and a loop exit counter to indicate a loop exit point.

20. The apparatus of claim 18, wherein the strand documentation for each of the plurality of strands further comprises a program order and a step size.

* * * * *